(12) United States Patent
Karakkad Kesavan Namboodiri et al.

(10) Patent No.: US 11,540,111 B2
(45) Date of Patent: Dec. 27, 2022

(54) OPTIMIZED MULTIPLE SUBSCRIBER IDENTITY MODULE MODE IN HIGH MOBILITY ENVIRONMENTS

(71) Applicant: QUALCOMM Incorporated, San Diego, CA (US)

(72) Inventors: Vishnu Namboodiri Karakkad Kesavan Namboodiri, Hyderabad (IN); Shashidhar Vummintala, Bangalore (IN); Suresh Sanka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 17/209,018

(22) Filed: Mar. 22, 2021

(65) Prior Publication Data

US 2022/0303755 A1 Sep. 22, 2022

(51) Int. Cl.
*H04W 8/18* (2009.01)
*H04W 8/20* (2009.01)
*H04B 17/318* (2015.01)
*H04W 76/11* (2018.01)
*H04W 24/10* (2009.01)
*H04W 8/08* (2009.01)

(52) U.S. Cl.
CPC .......... *H04W 8/183* (2013.01); *H04B 17/318* (2015.01); *H04W 8/08* (2013.01); *H04W 8/20* (2013.01); *H04W 24/10* (2013.01); *H04W 76/11* (2018.02)

(58) Field of Classification Search
CPC ......... H04W 8/183; H04W 8/08; H04W 8/20; H04W 76/11; H04W 24/10; H04B 17/318

USPC .......................................................... 370/329
See application file for complete search history.

(56) References Cited

U.S. PATENT DOCUMENTS

| 8,688,122 B2* | 4/2014 | Mutya | H04W 52/0254 455/442 |
| 9,402,274 B1* | 7/2016 | Rajurkar | H04W 76/15 |
| 9,491,693 B1* | 11/2016 | Chuttani | H04W 48/16 |
| 10,244,426 B2* | 3/2019 | Xu | H04L 27/00 |
| 10,638,253 B1* | 4/2020 | Parkvall | H04B 7/0848 |

(Continued)

FOREIGN PATENT DOCUMENTS

| EP | 2521406 A1 | 11/2012 | |
| EP | 3332588 B1 * | 3/2022 | H04W 56/002 |
| WO | WO-2022130273 A1 * | 6/2022 | |

OTHER PUBLICATIONS

International Search Report and Written Opinion—PCT/US2022/070641—ISA/EPO—May 17, 2022.

*Primary Examiner* — Mong-Thuy T Tran
(74) *Attorney, Agent, or Firm* — Harrity & Harrity, LLP

(57) ABSTRACT

Various aspects of the present disclosure generally relate to wireless communication. In some aspects, a first subscriber identity module (SIM) of a user equipment (UE) may detect that the UE is operating in a high mobility environment. The first SIM of the UE may transmit, to a second SIM operating in an idle mode, an indication that the UE is operating in the high mobility environment and an indication of a first frequency error estimation associated with the first SIM. The second SIM of the UE may operate in a high mobility mode using a second frequency error estimation that is based at least in part on the first frequency error estimation associated with the first SIM. Numerous other aspects are described.

30 Claims, 9 Drawing Sheets

(56) References Cited

U.S. PATENT DOCUMENTS

| | | | |
|---|---|---|---|
| 11,228,898 B2* | 1/2022 | Oh | H04W 48/18 |
| 2013/0260761 A1* | 10/2013 | Walke | H04W 36/0027 |
| | | | 455/436 |
| 2016/0021660 A1 | 1/2016 | Krishnamurthy et al. | |
| 2016/0134317 A1 | 5/2016 | Hu et al. | |
| 2016/0183192 A1* | 6/2016 | Kang | H04W 52/0254 |
| | | | 370/311 |
| 2018/0049213 A1* | 2/2018 | Gholmieh | H04W 72/1215 |
| 2018/0206103 A1 | 7/2018 | Ventrapragada et al. | |
| 2020/0120458 A1* | 4/2020 | Aldana | H04W 4/08 |

* cited by examiner

OPTIMIZED MULTIPLE SUBSCRIBER IDENTITY MODULE MODE IN HIGH MOBILITY ENVIRONMENTS

FIELD OF THE DISCLOSURE

Aspects of the present disclosure generally relate to wireless communication and to techniques and apparatuses for an optimized multiple subscriber identity module (multi-SIM) mode in high mobility environments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a user equipment (UE) for wireless communication includes a memory and one or more processors operatively coupled to the memory. The memory and the one or more processors may be configured to: detect, by a first subscriber identity module (SIM) operating in a connected mode, that the UE is operating in a high mobility environment; transmit, by the first SIM and to a second SIM operating in an idle mode, an indication that the UE is operating in the high mobility environment and an indication of a first frequency error estimation associated with the first SIM; and operate, by the second SIM, in a high mobility mode using a second frequency error estimation that is based at least in part on the first frequency error estimation associated with the first SIM.

In some aspects, a method of wireless communication performed by a UE includes detecting, by a first SIM operating in a connected mode, that the UE is operating in a high mobility environment; transmitting, by the first SIM and to a second SIM operating in an idle mode, an indication that the UE is operating in the high mobility environment and an indication of a first frequency error estimation associated with the first SIM; and operating, by the second SIM, in a high mobility mode using a second frequency error estimation that is based at least in part on the first frequency error estimation associated with the first SIM.

In some aspects, a non-transitory computer-readable medium storing a set of instructions for wireless communication includes one or more instructions that, when executed by one or more processors of a UE, cause the UE to: detect, by a first SIM operating in a connected mode, that the UE is operating in a high mobility environment; transmit, by the first SIM and to a second SIM operating in an idle mode, an indication that the UE is operating in the high mobility environment and an indication of a first frequency error estimation associated with the first SIM; and operate, by the second SIM, in a high mobility mode using a second frequency error estimation that is based at least in part on the first frequency error estimation associated with the first SIM.

In some aspects, an apparatus for wireless communication includes means for detecting, by a first SIM operating in a connected mode, that the apparatus is operating in a high mobility environment; means for transmitting, by the first SIM and to a second SIM operating in an idle mode, an indication that the apparatus is operating in the high mobility environment and an indication of a first frequency error estimation associated with the first SIM; and means for operating, by the second SIM, in a high mobility mode using a second frequency error estimation that is based at least in part on the first frequency error estimation associated with the first SIM.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
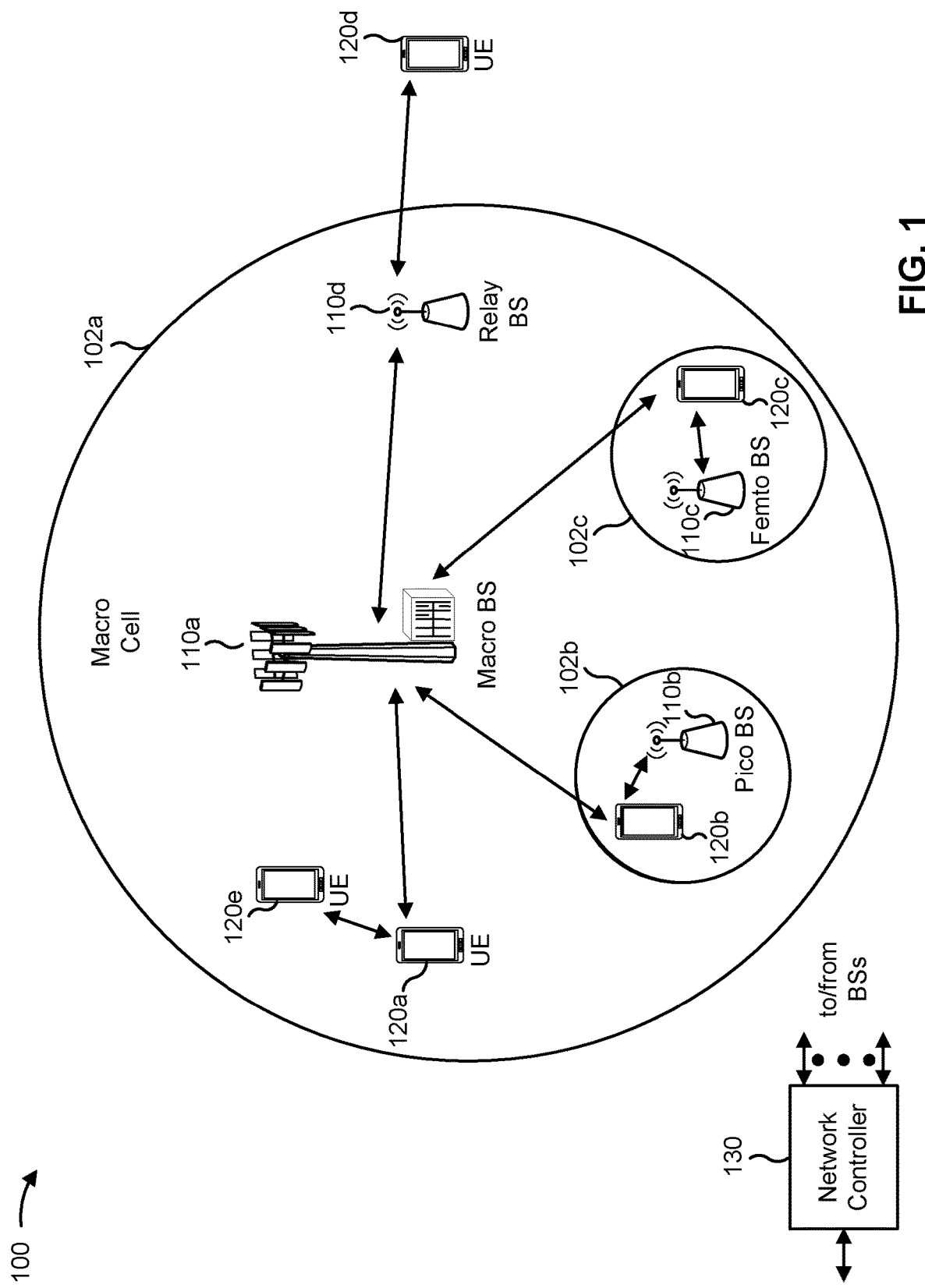
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
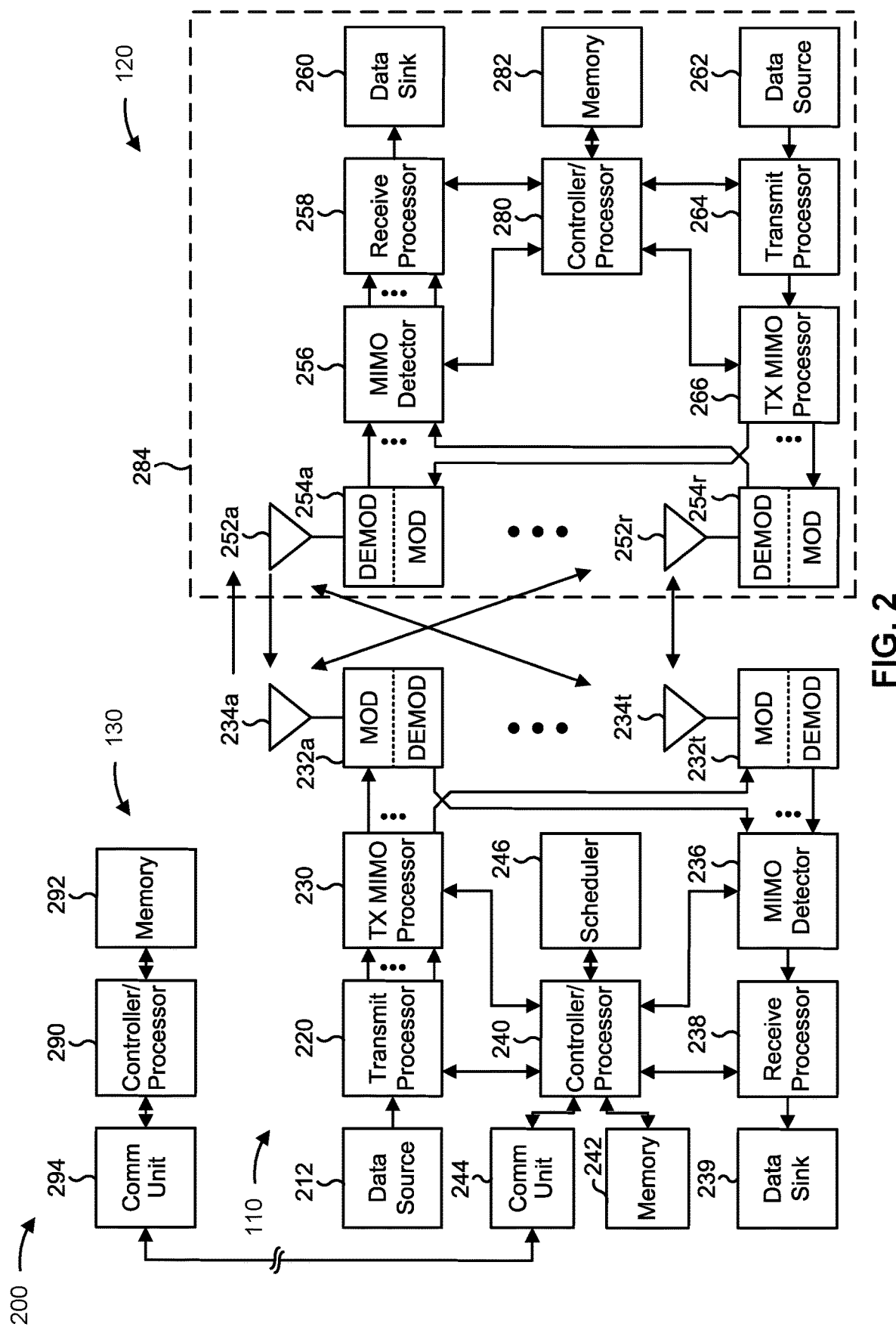
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 7 and 8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 7 and 8).

Controller/processor 240 of base station 110, controller/processor 280 of UE 120, and/or any other component(s) of FIG. 2 may perform one or more techniques associated with an optimized multiple subscriber identity module (multi-SIM) mode in a high mobility environment, as described in more detail elsewhere herein. For example, controller/processor 240 of base station 110, controller/processor 280 of UE 120, and/or any other component(s) of FIG. 2 may perform or direct operations of, for example, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, and/or other processes as described herein. In some aspects, executing instructions may include running the instructions, converting the instructions, compiling the instructions, and/or interpreting the instructions, among other examples.

In some aspects, the UE 120 includes means for detecting, by a first subscriber identity module (SIM) operating in a connected mode, that the UE 120 is operating in a high mobility environment; means for transmitting, by the first SIM and to a second SIM operating in an idle mode, an indication that the UE 120 is operating in the high mobility environment and an indication of a first frequency error estimation associated with the first SIM; and/or means for operating, by the second SIM, in a high mobility mode using a second frequency error estimation that is based at least in part on the first frequency error estimation associated with the first SIM. The means for the UE 120 to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE 120 includes means for transmitting, by the first SIM and to the second SIM, an indication of at least one of: a polarity of a received energy estimate value variation associated with the first SIM, or an identifier associated with a serving cell of the first SIM.

In some aspects, the UE 120 includes means for transmitting, by the first SIM and to the second SIM, the indication that the UE 120 is operating in the high mobility environment and the indication of the first frequency error estimation associated with the first SIM during a paging occasion associated with the second SIM.

In some aspects, the UE 120 includes means for transmitting, by the first SIM and to the second SIM, the indication that the UE 120 is operating in the high mobility environment and the indication of the first frequency error estimation associated with the first SIM via a SIM interface of the UE 120.

In some aspects, the UE 120 includes means for determining the second frequency error estimation associated with the second SIM based at least in part on the first frequency error estimation associated with the first SIM.

In some aspects, the UE 120 includes means for measuring, by the second SIM, a received energy estimate value for a serving cell of the second SIM based at least in part on the indication that the UE 120 is operating in the high mobility environment; means for determining a first polarity of a received energy estimate value variation for the second SIM based at least in part on comparing the received energy estimate value for the serving cell to a previous received energy estimate value of the serving cell; and/or means for determining that the second frequency error estimation associated with the second SIM is: the first frequency error estimation associated with the first SIM if the first polarity is a same polarity as a second polarity of a received energy estimate value variation for the first SIM, or the first frequency error estimation associated with the first SIM with a reversed polarity if the first polarity is a different polarity than the second polarity of the received energy estimate value variation for the first SIM.

In some aspects, the UE 120 includes means for identifying a first identifier associated with a first serving cell of the second SIM; means for identifying a second identifier associated with a second serving cell of the first SIM; means for determining a polarity combination associated with the first serving cell and the second serving cell based at least in part on identifying information stored by the UE 120 associated with the first identifier and the second identifier; and/or means for determining, based at least in part on the polarity combination, that the second frequency error estimation associated with the second SIM is: the first frequency error estimation associated with the first SIM, or the first frequency error estimation associated with the first SIM with a reversed polarity.

In some aspects, the UE 120 includes means for modifying, by the second SIM, a periodicity of a search and measurement procedure, associated with the second SIM, to a modified periodicity based at least in part on the indication that the UE is operating in the high mobility environment; and/or means for performing, by the second SIM, the search and measurement procedure using the modified periodicity.

In some aspects, the UE 120 includes means for measuring, by the second SIM, an RSRP value for a serving cell of the second SIM based at least in part on the indication that the UE is operating in the high mobility environment; and/or means for triggering, by the second SIM, a panic mode search and measurement procedure if the RSRP value for the serving cell of the second SIM does not satisfy a threshold.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
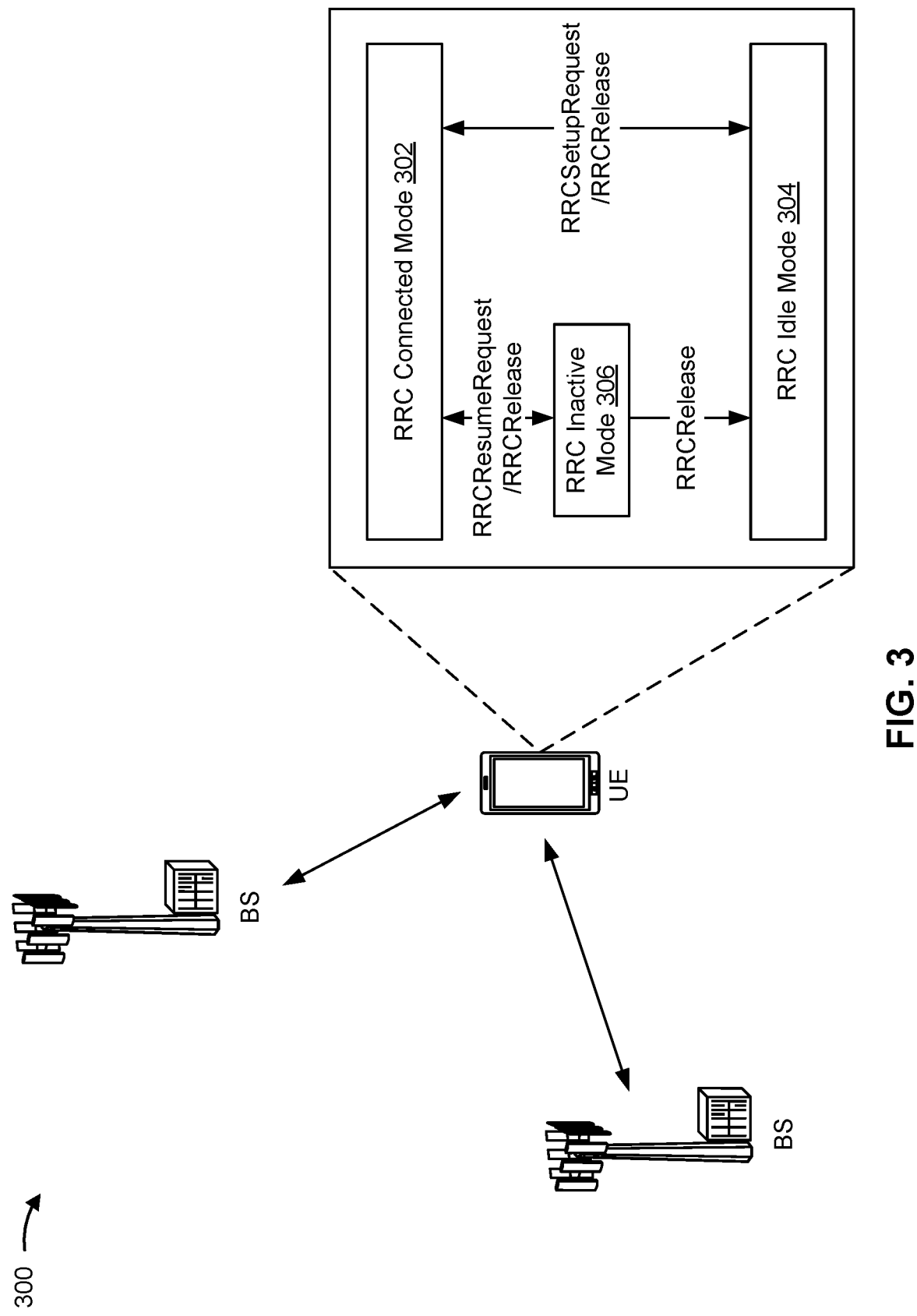
FIG. 3 illustrates an example of a wireless network in which a UE may support additional communication modes, in accordance with the present disclosure.

FIG. 3 illustrates an example 300 of a wireless network (e.g., wireless network 100) in which a UE (e.g., UE 120) may support additional communication modes, in accordance with the present disclosure. The UE may be communicatively connected with one or more base stations in the wireless network. For example, the UE may be connected to the one or more base stations in a dual connectivity configuration. In this case, a first base station may serve the UE as a control node or a primary node and a second base station may serve the UE as a secondary node.

As illustrated in FIG. 3, the UE may support a connected communication mode (e.g., a radio resource control (RRC) connected mode 302), an idle communication mode (e.g., an RRC idle mode 304), and an inactive communication mode (e.g., an RRC inactive mode 306). RRC inactive mode 306 may functionally reside between RRC connected mode 302 and RRC idle mode 304. The RRC modes (e.g., RRC connected mode 302, RRC idle mode 304, and/or RRC inactive mode 306) may be referred to as RRC states.

In the RRC connected mode 302, the UE may establish a communication connection with a base station (e.g., a radio access network (RAN) connection that includes a control plane connection and a user plane connection) for communicating data between the UE and the base station. That is, in the RRC connected mode 302 the UE and the base station may be enabled to transmit unicast data to and/or from the UE. Moreover, the UE may be enabled to perform network controlled mobility operations, such as performing measurements and/or transmitting measurement reports. In the RRC idle mode 304, the UE may be enabled to monitor for paging communications from a base station. The UE may transition to the RRC connected mode 302 based on receiving a page from the base station while in the RRC idle mode 304 (or the RRC inactive mode 306). In some cases, in the RRC idle mode 304, the UE may be configured with a discontinuous reception (DRX) cycle for monitoring for pages from the base station. Therefore, the UE may be enabled to enter a sleep state (e.g., in which the UE is not monitoring for communications) while in the RRC idle mode 304 to conserve power resources. The UE may be enabled to perform cell reselection operations while in the RRC idle mode 304 (or the RRC inactive mode 306). Similarly, in the RRC inactive mode 306, the UE may be enabled to monitor for paging communications from a base station and/or may be configured with a DRX cycle.

The UE may transition between different modes based at least in part on various commands and/or communications received from the one or more base stations. For example, the UE may transition from RRC connected mode 302 or RRC inactive mode 306 to RRC idle mode 304 based at least in part on receiving an RRCRelease communication. As another example, the UE may transition from RRC connected mode 302 to RRC inactive mode 306 based at least in part on receiving an RRCRelease with suspendConfig communication. As another example, the UE may transition from RRC idle mode 304 to RRC connected mode 302 based at least in part on receiving an RRCSetupRequest communication. As another example, the UE may transition from RRC inactive mode 306 to RRC connected mode 302 based at least in part on receiving an RRCResumeRequest communication. As described above, the UE may transition to the RRC connected mode 302 to enable data to be transferred between the UE and a base station. The UE may transition from the RRC connected mode 302 to the RRC idle mode 304 or the RRC inactive mode 306 to save power resources (e.g., when there is no data to be transferred).

When transitioning to RRC inactive mode 306, the UE and/or the one or more base stations may store a UE context (e.g., an access stratum (AS) context and/or higher-layer configurations). This permits the UE and/or the one or more base stations to apply the stored UE context when the UE transitions from RRC inactive mode 306 to RRC connected mode 302 in order to resume communications with the one or more base stations, which reduces latency of transitioning to RRC connected mode 302 relative to transitioning to the RRC connected mode 302 from RRC idle mode 304.

In some cases, the UE may communicatively connect with a new control node or a new primary node when transitioning from RRC idle mode 304 or RRC inactive mode 306 to RRC connected mode 302 (e.g., a control node or a primary node that is different from the last serving control node or a primary node when the UE transitioned to RRC idle mode 304 or RRC inactive mode 306). In this case, the new control node or a primary node may be responsible for identifying a secondary node for the UE in the dual connectivity configuration.

As indicated above, FIG. 3 is provided as an example. Other examples may differ from what is described with regard to FIG. 3.

Figure 4:
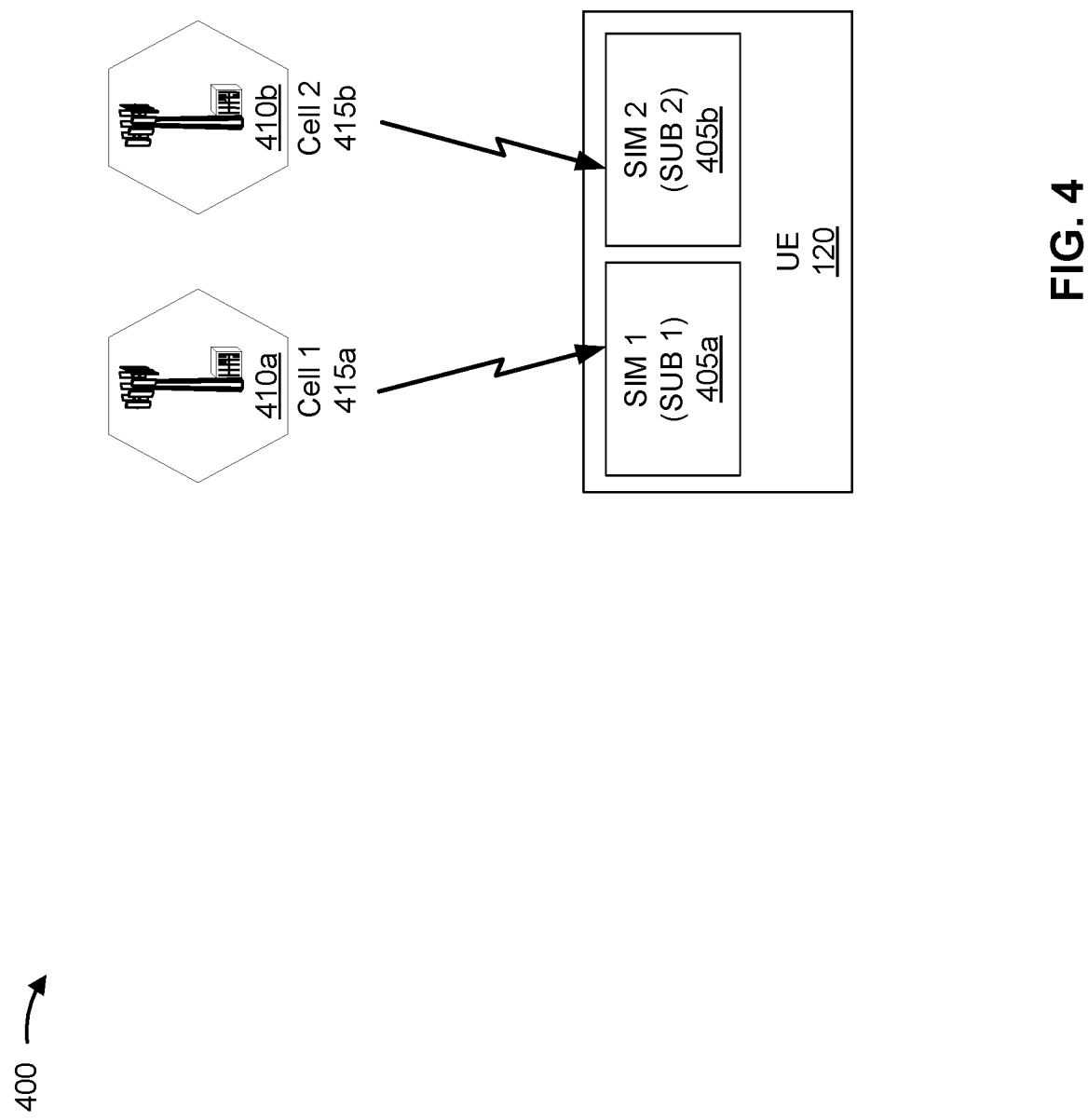
FIG. 4 is a diagram illustrating an example of a multiple subscriber identity module (multi-SIM) UE, in accordance with the present disclosure.

FIG. 4 is a diagram illustrating an example 400 of a multi-subscriber identity module (SIM) UE, in accordance with the present disclosure. As shown in FIG. 4, a UE 120 may be a multiple SIM (multi-SIM) UE that includes multiple SIMs (two or more SIMs), shown as a first SIM 405a and a second SIM 405b. The first SIM 405a may be associated with a first subscription (shown as SUB 1), and the second SIM 405b may be associated with a second subscription (shown as SUB 2). A subscription may be a subscription with a network operator (e.g., a mobile network operator (MNO)) that enables the UE 120 to access a wireless network (e.g., a radio access network (RAN)) associated with the network operator.

A SIM 405 may be a removable SIM (e.g., a SIM card) or an embedded SIM. A SIM 405 may include an integrated circuit that securely stores an international mobile subscriber identity (IMSI) and a security key, which are used to identify and authenticate a corresponding subscription associated with the SIM 405. In some cases, a SIM 405 may store a list of services that the UE 120 has permission to access using a subscription associated with the SIM 405, such as a data service or a voice service, among other examples.

As further shown in FIG. 4, the UE 120 may communicate (e.g., in a connected mode, an idle mode, or an inactive mode) with a first base station 410a via a first cell 415a (shown as Cell 1) using the first SIM 405a. In this case, a first subscription (SUB 1) of the UE 120 may be used to access the first cell 415a. For example, the first subscription of the UE 120 may access the first cell 415a using a first IMSI for UE identification, a first security key for UE authentication, a first list of services that the UE 120 is permitted to access using the first subscription, and/or by counting data or voice usage on the first cell against the first subscription, among other examples. Similarly, the UE 120 may communicate (e.g., in a connected mode, an idle mode, or an inactive mode) with a second base station 410b via a second cell 415b (shown as Cell 2) using the second SIM 405b. In this case, a second subscription (SUB 2) of the UE 120 may be used to access the second cell 415b. For example, the second subscription of the UE 120 may access the second cell 415b using a second IMSI for UE identification, using a second security key for UE authentication, using a second list of services that the UE 120 is permitted to access using the second subscription, and/or by counting data or voice usage on the second cell against the second subscription, among other examples.

The first base station 410a and/or the second base station 410b may include one or more of the base stations 110 described above in connection with FIGS. 1 and 2. Although the first cell 415a and the second cell 415b are shown as being provided by different base stations, in some aspects, the first cell 415 and the second cell 415b may be provided by the same base station. Thus, in some aspects, the first base station 410a and the second base station 410b may be integrated into a single base station.

In some cases, the UE 120 may be capable of operating in a multi-SIM multiple standby (MSMS) mode, such as a dual SIM dual standby (DSDS) mode (e.g., when the UE 120 is associated with two subscriptions). Additionally, or alternatively, the UE 120 may be capable of operating in a multi-SIM multiple active (SR-MSMA) mode, such as a dual SIM dual active (DSDA) mode (e.g., when the UE 120 is associated with two subscriptions).

In a DSDA mode, the UE 120 is capable of concurrent active communication using both SIMs of the UE 120. Thus, a UE 120 in the DSDA mode is capable of communicating using the first SIM 405a (and the first subscription) at the same time as communicating using the second SIM 405b (and the second subscription). For example, when the UE 120 is in an active session (e.g., a voice call or another latency sensitive service, such as online gaming, stock trading, or an over-the-top (OTT) service) using the first SIM 405a, the UE 120 is capable of receiving a notification of a voice call using the second SIM 405b without interrupting communications that use the first SIM 405a, and without tuning or switching away from the first cell 415a to tune to the second cell 415b.

In a DSDS mode, the UE 120 is not capable of concurrent active communication using both SIMs of the UE 120. Thus, a UE 120 in the DSDS mode is not capable of communicating using the first SIM 405a (and the first subscription) at the same time as communicating using the second SIM 405b (and the second subscription). However, a UE 120 in the DSDS mode may be capable of switching between two separate mobile network services, may include hardware for maintaining multiple connections (for example, one connection per SIM) in a standby state, or may include hardware (for example, multiple transceivers) for maintaining multiple network connections at the same time, among other examples. However, a UE 120 in the DSDS mode may be capable of receiving data on only one connection at a time because radio frequency resources are shared between the multiple subscriptions. For example, a UE 120 in the DSDS mode may be associated with multiple subscriptions but may include only a single transceiver shared by the multiple subscriptions, a single transmit chain shared by the multiple subscriptions, or a single receive chain shared by the multiple subscriptions, among other examples.

In some examples, a UE 120 may be capable of operating in a DSDA mode for a first combination of RATs and may not be capable of operating in a DSDA mode for a second combination of RATs. For example, the UE 120 may be capable of operating in a DSDA mode for NR+NR, where the first cell 415a (as well as the first SIM 405b and the first subscription) uses an NR RAT and the second cell 415b (as well as the second SIM 405b and the second subscription) also uses the NR RAT. However, the UE 120 may not be capable of operating in a DSDA mode for NR+LTE, where one of the first cell 415a (as well as the first SIM 405b and the first subscription) uses an NR RAT and the second cell 415b (as well as the second SIM 405b and the second subscription) uses an LTE RAT (or vice versa). In some aspects, the UE 120 may not be capable of operating in the DSDA mode for the second combination of RATs (e.g., NR+LTE), but may be capable of operating in a DSDS mode for the second combination of RATs. This UE design reduces design costs as compared to enabling the UE 120 to operate using the DSDA mode for the second combination of RATs.

As indicated above, FIG. 4 is provided as an example. Other examples may differ from what is described with regard to FIG. 4.

Figure 5:
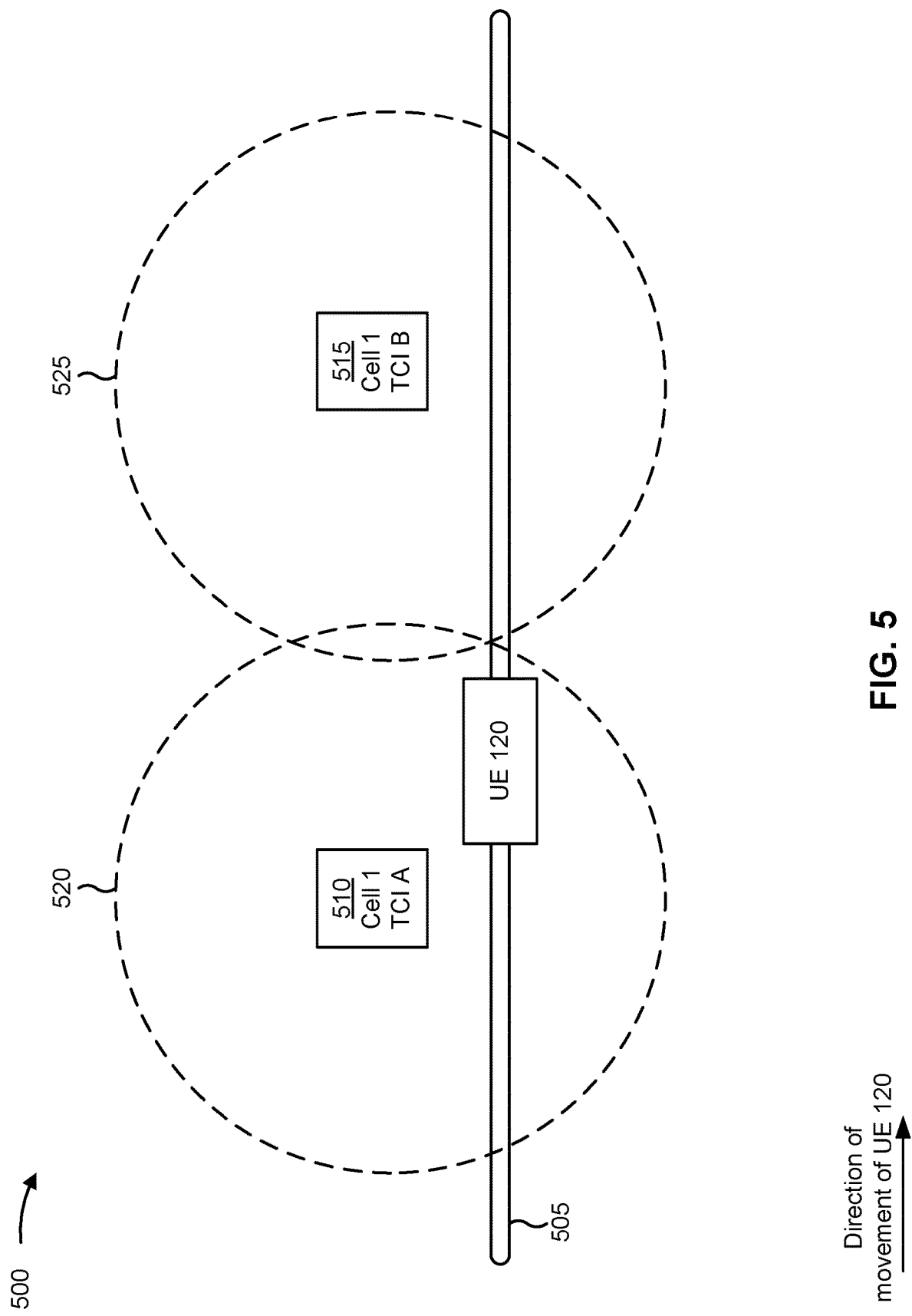
FIG. 5 is a diagram illustrating an example of a high mobility environment, in accordance with the present disclosure.

FIG. 5 is a diagram illustrating an example 500 of a high mobility environment, in accordance with the present disclosure. "High mobility environment" may refer to an environment in which a UE 120 is traveling at a speed that is greater than a threshold (e.g., a high rate of speed). For example, the threshold may be 200 kilometers/hour (km/h), 300 km/h, 500 km/h, and/or higher rates of speed. For example, a high mobility environment may be a high speed train (HST) environment. High speed trains may travel at speeds of more than 300 km/h. Other examples of high mobility environments may include a high speed vehicle environment (e.g., where the UE 120 is traveling in a vehicle at a high rate of speed), a high speed air travel environment (e.g., where the UE 120 is included in a drone, an unmanned aerial vehicle (UAV), or other aircraft at a high rate of speed), an environment in which the UE is experiencing a rapid change in altitude, and/or any other environment in which the UE 120 is traveling at a high rate of speed. Some examples described herein may be described in connection with an HST environment. However, it should be understood that such examples may be similarly applied to other high mobility environments.

As shown by reference number 505, the UE 120 may be traveling on a known or predetermined path in the high mobility environment. For example, the path shown by reference number 505 may be a train track for an HST. In some aspects, the path shown by reference number 505 may be a road or a predetermined flight path. As shown in FIG. 5, a wireless network may be deployed along the path. In some deployments, a base station 110 may be associated with multiple remote radio heads (RRHs). An RRH, also referred to as a remote radio unit (RRU), may be a remote radio transceiver (e. g., remote relative to the base station 110). RRHs may extend coverage of the base station 110 in challenging environments such as rural areas, buildings, and tunnels. In some cases, a base station 110 may provide a cell (e.g., cell 1, as shown in FIG. 5) that is associated with a physical cell identifier (PCI). In the case when the base station 110 is associated with multiple RRHs, the multiple RRHs may each have respective PCIs. Thus, each RRH can use a respective PCI and can transmit a full set of synchronization signal block (SSB) identifiers of the base station 110.

For example, as shown by reference numbers 510 and 515, a first cell may be associated with a first RRH (e.g., shown by reference number 510) and a second RRH (e.g., shown by reference number 515) that are deployed along the path of the UE 120 (e.g., along an HST track). An RRH may be associated with a transmission configuration indicator (TCI) state. A TCI state may indicate a directionality or a characteristic of a downlink beam of the RRH, such as one or more quasi-co-location (QCL) properties of the downlink beam. A QCL property may include, for example, a Doppler shift, a Doppler spread, an average delay, a delay spread, and/or spatial receive parameters, among other examples. For example, as shown in FIG. 5, the first RRH may be associated with a TCI state A and the second RRH may be associated with a second TCI state B.

As shown by reference number 520, the first RRH may support a first wireless coverage area of the first cell. As shown by reference number 525, the second RRH may support a second wireless coverage area of the first cell. In some cases, the first wireless coverage area (e.g., shown by reference number 520) and/or the second wireless coverage area (e.g., shown by reference number 525) may be supported by a base station 110, rather than an RRH. In some cases, the first wireless coverage area (e.g., shown by reference number 520) and the second wireless coverage area (e.g., shown by reference number 525) may be associated with different cells (e.g., may be associated with different base stations 110).

As described above, the high mobility environment may include the UE 120 traveling at a high rate of speed. Therefore, the high rate of speed may cause handover events to occur frequently, as the UE 120 moves from cell to cell (e.g., from coverage area to coverage area). For example, the UE 120 may move quickly from the first wireless coverage area (e.g., shown by reference number 520) to the second wireless coverage area (e.g., shown by reference number 525). Handover procedures designed for a normal operating mode of the UE 120 may not be able to occur quickly enough to support this type of UE 120 movement. Therefore, to account for the high rate of speed of the UE 120, the UE 120 may operate in a high mobility mode (e.g., an HST mode) when the UE 120 detects that the UE 120 is operating in a high mobility environment. The high mobility mode may include the UE 120 performing search and measurement procedures more frequently (e.g., the UE 120 may decrease a periodicity associated with configured search and measurement procedures, to perform the search and measurement procedures more often). Additionally, or alternatively, the high mobility mode may include aggressive or more robust loop tracking, demodulation enhancements, and/or other improvements to avoid time track loop (TTL) aliasing, among other examples, to improve performance of the UE 120 while operating in the high mobility environment.

The UE 120 may detect that the UE 120 is operating in a high mobility environment based at least in part on a change in a frequency error estimation over a period of time. For example, the UE 120 may estimate a frequency error (e.g., associated with a Doppler shift in the high mobility environment) associated with a serving cell of the UE 120 (e.g., the first cell and the first RRH as shown in FIG. 5). The UE 120 may determine a change in the frequency error estimation for the serving cell over a period of time. If the change in frequency error estimation for the serving cell satisfies a threshold, then the UE 120 may determine that the UE 120 is operating in a high mobility environment. For example, large changes in frequency error estimation over the period of time may indicate that the UE 120 is traveling at a high rate of speed (e.g., may indicate that the UE is operating in a high mobility environment). In some cases, the UE 120 may receive (e.g., from a base station 110 or another device) an indication of the high mobility environment. In some cases, the UE 120 may detect the high mobility environment based at least in part on a location of the UE 120. For example, as the path, such as an HST track, associated with the high mobility environment may be fixed and/or known, the UE 120 may detect the high mobility environment based at least in part on detecting that the location of the UE 120 is near or on the known or fixed path. The UE 120 may use the detection of the high mobility environment to transition from a normal operating mode to the high mobility mode, as described above, to improve performance of the UE 120 while operating in the high mobility environment.

As indicated above, FIG. 5 is provided as an example. Other examples may differ from what is described with regard to FIG. 5.

Figure 6:
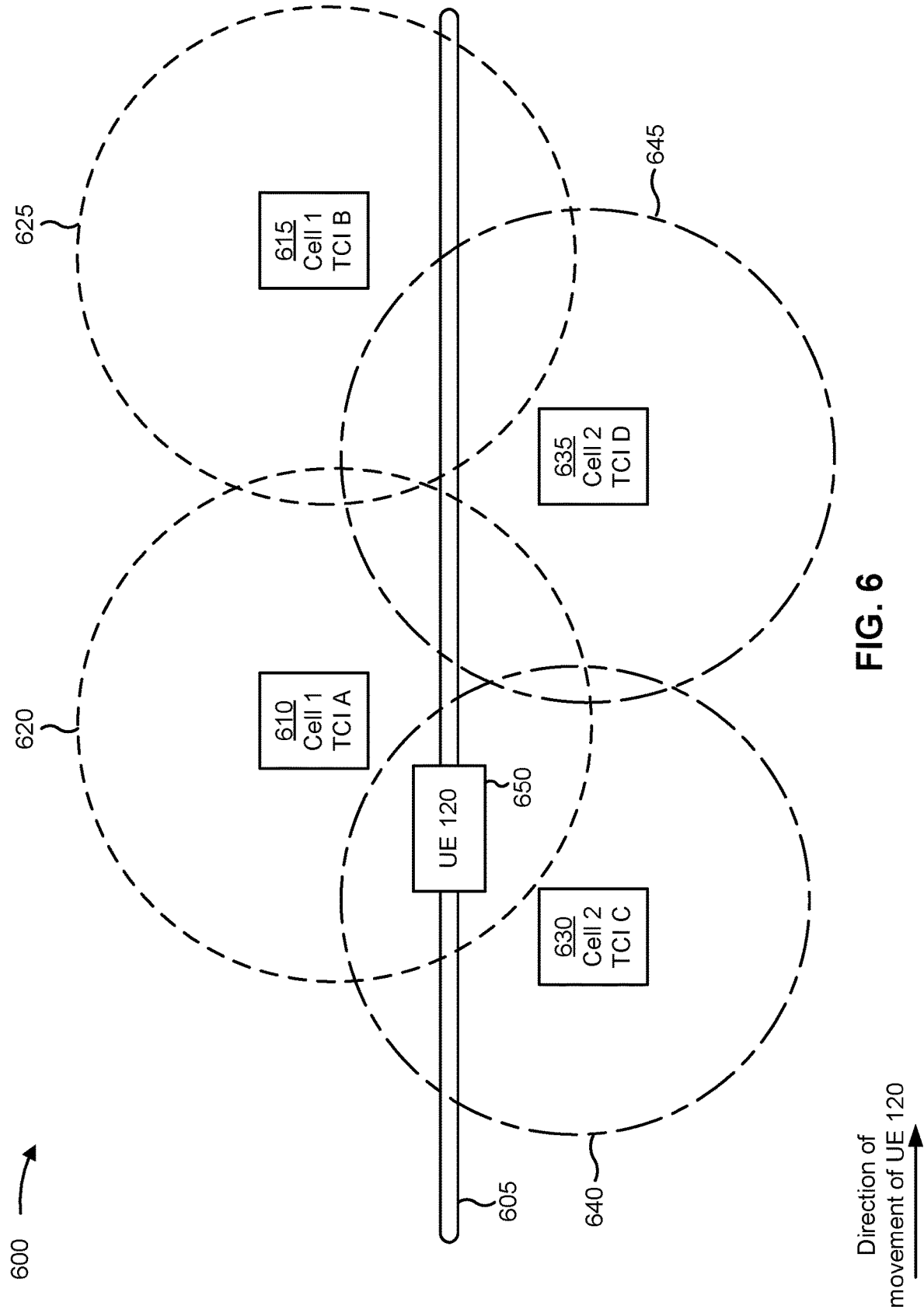
FIG. 6 is a diagram illustrating an example of a multi-SIM UE operating in a high mobility environment, in accordance with the present disclosure.

FIG. 6 is a diagram illustrating an example 600 of a multi-SIM UE operating in a high mobility environment, in accordance with the present disclosure. As shown in FIG. 6, a UE 120 may be operating in a high mobility environment in a similar manner as described above in connection with FIG. 5. For example, as shown by reference number 605, the UE 120 may be traveling at a high rate of speed along a known or fixed path (e.g., along an HST track). The UE 120 may be a multi-SIM UE as described above in connection with FIG. 4. For example, the UE 120 may include a first SIM and a second SIM. The first SIM may be associated with a first subscription and the second SIM may be associated with a second subscription. As described above, a subscription may be a subscription with a network operator (e.g., an MNO) that enables the UE 120 to access a wireless network associated with the network operator.

For example, as shown by reference numbers 610 and 615, a first network operator associated with the first subscription and the first SIM of the UE 120 may be associated with base stations 110 and/or RRHs deployed along the path of the UE 120. In a similar manner as described above in connection with FIG. 5, the base stations 110 and/or the RRHs associated with first network operator may provide or support a first wireless coverage area (e.g., shown by reference number 620) and a second wireless coverage area (e.g., shown by reference number 625). Similarly, as shown by reference numbers 630 and 635, a second network operator associated with the second subscription and the second SIM of the UE 120 may be associated with base stations 110 and/or RRHs deployed along the path of the UE 120. The base stations 110 and/or the RRHs associated with second network operator may provide or support a third wireless coverage area (e.g., shown by reference number 640) and a fourth wireless coverage area (e.g., shown by reference number 645). As described above, each wireless coverage area may be associated with a different TCI state. For example, the first wireless coverage area may be associated with a TCI state A, the second wireless coverage area may be associated with a TCI state B, the third wireless coverage area may be associated with a TCI state C, and the fourth wireless coverage area may be associated with a TCI state D.

In some cases, each SIM of the UE 120 may be required to independently track and detect whether the UE 120 is operating in a high mobility environment. For example, the first SIM of the UE 120 may detect that the UE 120 is operating in a high mobility environment and may transition to a high mobility mode on the first SIM. Similarly, the second SIM of the UE 120 may independently detect that the UE 120 is operating in a high mobility environment and may transition to a high mobility mode on the second SIM. However, the tracking and detection of whether the UE 120 is operating in a high mobility environment consumes significant resources (e.g., power resources and/or processing resources) of the UE 120. Therefore, independently tracking and detecting whether the UE 120 is operating in a high mobility environment on different SIMs of a multi-SIM UE consumes significant resources of the UE 120 and is suboptimal (e.g., as both SIMs of the UE 120 are associated with the same UE 120 both SIMs will be operating in the same environment).

Moreover, in some cases, a SIM of the UE 120 may be operating in an idle mode (e.g., an RRC idle mode). For example, the first SIM of the UE 120 may be connected to a first cell (e.g., cell 1) in a connected mode (e.g., an RRC connected mode) and the second SIM of the UE 120 may be connected to a second cell (e.g., cell 2) in the idle mode. When operating in the idle mode, the second SIM may be configured with a DRX cycle for monitoring for pages from the second cell. Therefore, the amount of time between the second SIM receiving a communication (e.g., and estimating a frequency error) may be larger than if the second SIM were operating in a connected mode. As a result, it may take more time for the second SIM operating in the idle mode to detect that the UE 120 is operating in a high mobility environment. Therefore, there may be a delay between a time when the UE 120 begins operating in the high mobility environment and a time when the second SIM transitions to operating in a high mobility mode. In some cases, due to the high rate of speed at which the UE 120 is traveling in the high mobility environment, the delay may cause a radio link failure (RLF) on the second SIM.

However, a direct extension of or indication of a high mobility mode from a first SIM of the UE 120 to a second SIM of the UE 120 may result in the second SIM using incorrect or inaccurate information for operating in a high mobility mode. For example, as shown by reference number 650, the UE 120 may be traveling towards an RRH or a base station associated with the first cell (e.g., the cell that the first SIM is connected to) and away from an RRH or a base station associated with the second cell (e.g., the cell that the second SIM is connected to). To enable the second SIM to operate in the high mobility mode, the first SIM may need to provide a frequency error estimation associated with the first SIM to the second SIM. However, as the UE 120 is traveling towards the first cell and away from the second cell, the frequency error estimation to be applied by the first SIM may be a different polarity than a frequency error estimation to be applied by the second SIM. In another case, the UE 120 may be traveling towards both the first cell and the second cell, or away from both the first cell and the second cell, and a polarity of the frequency error estimation for the first SIM and the second SIM may be the same.

However, the second SIM may be unaware of a deployment of base stations and/or RRHs that the first SIM is connected to. Therefore, the second SIM may be unaware of whether a direction of movement UE 120 with respect to RRHs or base stations of the first SIM and the second SIM is the same (e.g., moving towards or away from both cells) or different (e.g., moving towards one cell and away from another cell). As a result, a direct extension of information from the first SIM to the second SIM may result in the second SIM applying an incorrect or inaccurate frequency error estimation associated with a high mobility operating mode.

Some techniques and apparatuses described herein enable an optimized multi-SIM mode in a high mobility environment. In some aspects, a first SIM of the UE 120, operating in a connected mode, may detect that the UE 120 is operating in a high mobility environment. The first SIM may transmit (e.g., via a SIM interface of the UE 120), to a second SIM of the UE 120 operating in an idle mode, an indication of the high mobility environment and an indication of a first frequency error estimation associated with the first SIM. The second SIM may identify a second frequency error estimation associated with the second SIM based at least in part on the first frequency error estimation (e.g., the second SIM may determine whether a polarity of the first frequency error estimation needs to be reversed to be applied by the second SIM). The second SIM may transition to operating in a high mobility mode using the second frequency error estimation (e.g., that is based at least in part on the first frequency error estimation associated with the first SIM).

As a result, the second SIM may be enabled to accurately determine a frequency error estimation to be applied by the second SIM (e.g., based at least in part on the first frequency error estimation provided by the first SIM). Additionally, the second SIM, operating in an idle mode, may be enabled to reduce an amount of time associated with detecting the high mobility environment. This may ensure that the second SIM can quickly transition to operating in the high mobility mode (e.g., with more frequent search and measurement procedures). As a result, the second SIM may reduce a likelihood of an RLF on the second SIM that is due to a delay in transitioning to the high mobility mode (e.g., as described above). Additionally, the second SIM may be enabled to quickly identify if a measurement value (e.g., an RSRP value and/or a signal-to-noise ratio (SNR) value) of the serving cell of the second SIM is poor (e.g., is below a threshold). Therefore, the second SIM may be enabled to immediately trigger a panic mode search and measurement procedure if the measurement value of the serving cell of the second SIM is poor (e.g., rather than waiting until a measurement at a next paging occasion associated with the idle mode). This may ensure that the second SIM can quickly identify a new serving cell to establish a connection with, thereby improving performance of the second SIM and the UE 120.

As indicated above, FIG. 6 is provided as an example. Other examples may differ from what is described with regard to FIG. 6.

Figure 7:
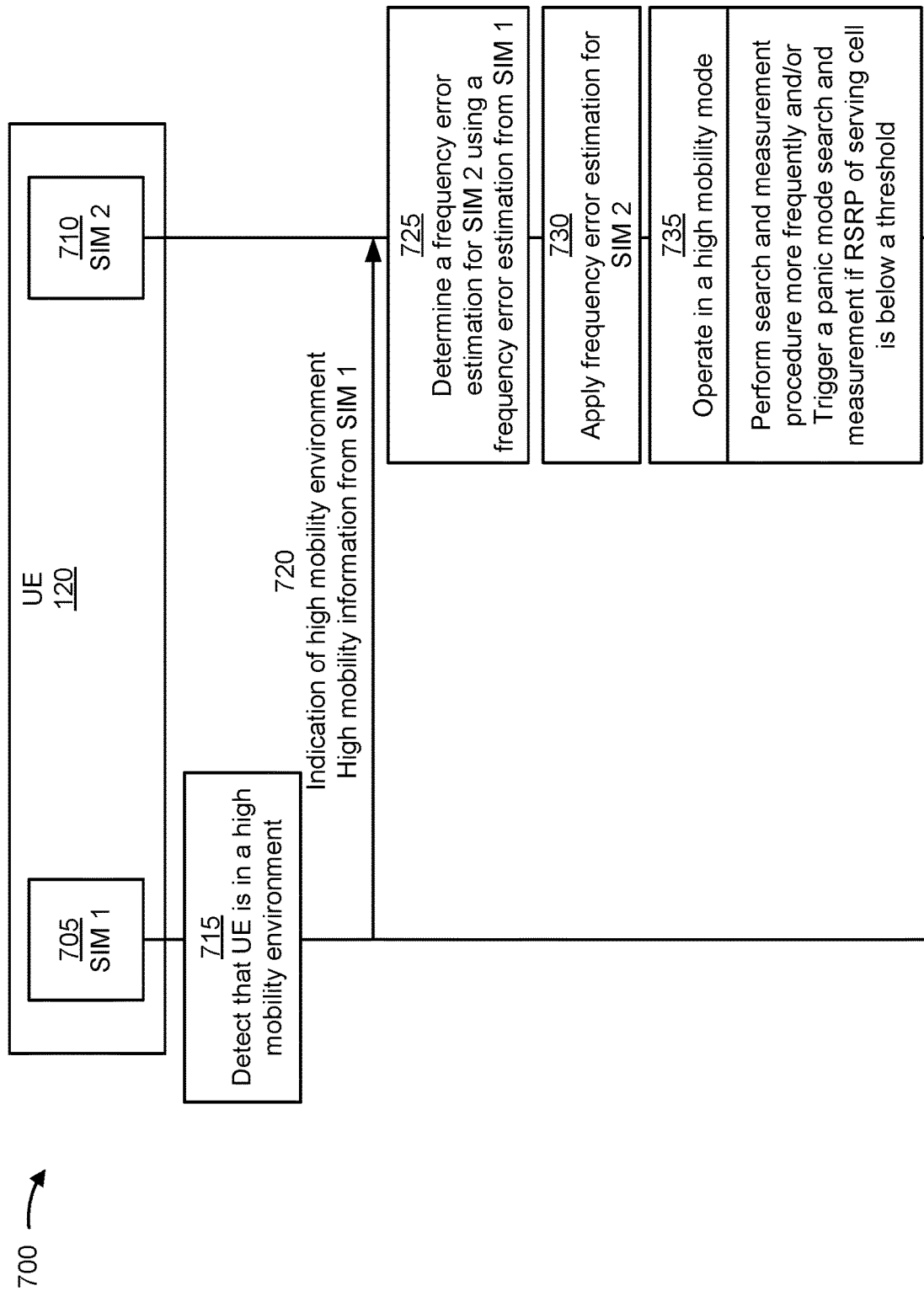
FIG. 7 is a diagram illustrating an example associated with an optimized multi-SIM mode in a high mobility environment, in accordance with the present disclosure.

FIG. 7 is a diagram illustrating an example 700 associated with an optimized multi-SIM mode in a high mobility environment, in accordance with the present disclosure. As shown in FIG. 7, a UE 120 may be a multi-SIM UE in a similar manner as described above in connection with FIG. 4. For example, the UE 120 may include a first SIM 705 (e.g., SIM 1) and a second SIM 710 (e.g., SIM 2). The first SIM 705 may be associated with a first subscription and the second SIM 710 may be associated with a second subscription (e.g., in a similar manner as described above in connection with FIG. 4). As described above, a subscription may be a subscription with a network operator (e.g., an MNO) that enables the UE 120 to access a wireless network associated with the network operator. The UE 120 may be operating in a high mobility environment in a similar manner as described above in connection with FIGS. 5 and 6. In some aspects, the UE 120 may be included in a wireless network, such as wireless network 100.

The first SIM 705 may communicate with a first cell (e.g., a first base station 110 and/or a first RRH) in a connected mode (e.g., an RRC connected mode). The second SIM 710 may communicate with a second cell (e.g., a second base station 110 and/or a second RRH) in an idle mode (e.g., an RRC idle mode). For example, the UE 120 may be operating in a dual receive DSDS (DR-DSDS) mode. When operating in a DR-DSDS mode, the UE 120 may communicate traffic, associated with the first SIM 705, using a first receive (Rx) chain of the UE 120 and at least a first transmit chain of the UE 120. In some aspects, the UE 120 may also use a second Tx chain of the UE 120 in order to support the traffic. For example, the UE 120 may be configured for uplink carrier aggregation (CA) and/or MIMO operation in order to support transmissions associated with the first cell that uses the first SIM 705. During operation in the DR-DSDS mode, the UE 120 may use a second Rx chain of the UE 120 to check a paging channel associated with the second SIM 710 (e.g., according to a DRX cycle associated with the idle mode) and, if a traffic is detected using the second Rx chain, the UE 120 may suspend the traffic on the first SIM 705 and communicate the traffic associated with the second SIM 710.

As shown by reference number 715, the first SIM 705 may detect that the UE is operating in a high mobility environment. For example, the first SIM 705 may detect that the UE is operating in a high mobility environment in a similar manner as described above in connection with FIG. 5. The first SIM 705 may detect that the UE 120 is operating in a high mobility environment based at least in part on a change in a frequency error estimation over a period of time. For example, the first SIM 705 may estimate a frequency error (e.g., associated with a Doppler shift in the high mobility environment) associated with a serving cell of the first SIM 705. The first SIM 705 may determine a change in the frequency error estimation for the serving cell over a period of time. If the change in frequency error estimation for the serving cell satisfies a threshold, then the first SIM 705 may determine that the UE 120 is operating in a high mobility environment.

In some aspects, the first SIM 705 may determine a polarity of a received energy estimate value variation associated with the serving cell of the first SIM 705. "Received energy estimate value variation" may refer to a change in a measured received energy estimate value (e.g., by the first SIM 705 and/or the UE 120) for a serving cell over a period of time. For example, the received energy estimate value variation may be an RSRP value variation, a signal-to-noise ratio (SNR) value variation, and/or an RSSI value variation, among other examples. The polarity of the received energy estimate value variation may indicate whether the received energy measured by the first SIM 705 (e.g., by the UE 120) for the serving cell of the first SIM 705 is increasing or decreasing. For example, a positive polarity may indicate that the received energy value associated with the serving cell is increasing. A negative polarity may indicate that the received energy value associated with the serving cell is decreasing. For example, the first SIM 705 may measure an RSRP value of the serving cell of the first SIM 705 to obtain a current RSRP value of the serving cell. The first SIM 705 may compare the current RSRP value to a previous RSRP value (e.g., an RSRP value measured at a previous time) of the serving cell to determine the polarity of the RSRP value variation for the serving cell of the first SIM 705.

The polarity of the received energy estimate value variation for the serving cell of the first SIM 705 may indicate whether the UE 120 is moving towards the serving cell (e.g., towards a base station 110 and/or an RRH of the serving cell) or away from the serving cell. For example, a positive received energy estimate value variation polarity (e.g., an increasing RSRP value or an increasing SNR value) may indicate that the UE 120 is moving towards the serving cell (e.g., towards a base station 110 and/or an RRH of the serving cell) because the signal strength of the serving cell is increasing over time. In contrast, a negative received energy estimate value variation polarity (e.g., a decreasing RSRP value or a decreasing SNR value) may indicate that the UE 120 is moving away from the serving cell because the signal strength of the serving cell is decreasing over time.

As shown by reference number 720, the first SIM 705 may transmit, to the second SIM 710, an indication of the high mobility environment and/or an indication of high mobility information associated with the first SIM 705. The first SIM 705 may transmit the indication(s) to the second SIM 710 via a SIM interface of the UE 120. The first SIM 705 may transmit the indication(s) to the second SIM 710 during a paging occasion associated with the second SIM 710. For example, as described above, the second SIM 710 may be operating in an idle mode. The idle mode may include a configured DRX cycle. A DRX cycle may include an active time or an on duration, during which the second SIM 710 is configured to monitor for one or more communications, and an idle time or an off duration during which the second SIM 710 may enter a sleep state (e.g., where the second SIM 710 does not monitor for communications) for power savings. A paging occasion may correspond to or may be scheduled during the active time or the on duration of the DRX cycle of the second SIM 710. Therefore, the first SIM 705 may transmit the indication(s) to the second SIM 710 during a paging occasion associated with the second SIM 710 to ensure that the second SIM 710 is not in a sleep state and is monitoring for communications. In some aspects, the first SIM 705 may transmit the indication(s) to the second SIM 710 during a next scheduled paging occasion after the first SIM 705 detects that the UE 120 is operating in the high mobility environment (e.g., to reduce a latency associated with notifying the second SIM 710 of the high mobility environment and/or the high mobility information). In some aspects, the first SIM 705 may transmit the indication(s) to the second SIM 710 during a tune away process associated with tuning front end components of the UE 120 from the first SIM 705 to the second SIM 710.

The high mobility information associated with the first SIM 705 may include an indication that the UE 120 is operating in the high mobility environment. In some aspects, the high mobility information associated with the first SIM 705 may include an indication of a frequency error estimation associated with the first SIM 705 (e.g., a frequency error estimation measured and/or determined by the first SIM 705). In some aspects, the high mobility information associated with the first SIM 705 may include an indication of a polarity of a received energy estimate value variation associated with the serving cell of the first SIM 705. In some aspects, the high mobility information associated with the first SIM 705 may include an indication of an identifier associated with the serving cell of the first SIM 705. The identifier associated with the serving cell of the first SIM 705 may include a PCI of the serving cell, an identifier of a TCI state of the serving cell, and/or a cell global identifier (CGI) of the serving cell, among other examples.

The second SIM 710 may receive the indication(s) (e.g., of the high mobility environment and/or the high mobility information associated with the first SIM 705) from the first SIM 705. The second SIM 710 may perform one or more actions based at least in part on receiving the indication(s) to improve a communication performance of the second SIM 710 in the high mobility environment. For example, as shown by reference number 725, the second SIM 710 may determine a frequency error estimation for the second SIM 710 based at least in part on the frequency error estimation received from the first SIM 705. As used herein, "first frequency error estimation" may refer to the frequency error estimation associated with (e.g., measured and/or determined by) the first SIM 705. "Second frequency error estimation" may refer to the frequency error estimation for the second SIM 710.

As described above, the second SIM 710 may determine whether a polarity of the first frequency error estimation needs to be reversed in order to be applied by the second SIM 710 as the second frequency error estimation. For example, a polarity of a frequency error estimation may indicate whether the UE 120 is moving towards or away from a serving cell. A positive polarity of a frequency error estimation may indicate that the UE 120 is moving towards a serving cell (e.g., towards a base station and/or RRH of the serving cell). A negative polarity of a frequency error estimation may indicate that the UE 120 is moving away from a serving cell (e.g., away from a base station and/or RRH of the serving cell). As described above, and as depicted in FIG. 6, in some scenarios, the UE 120 may be moving towards a serving cell for the first SIM 705 and away from the serving cell of the second SIM 710, and vice versa. As a result, directly applying the first frequency error estimation as the second frequency error estimation may result in the second SIM 710 applying a frequency error estimation with an incorrect or reversed polarity. Therefore, the second SIM 710 may determine whether the UE 120 is traveling in the same direction or in opposite directions with respect to the serving cell of the first SIM 705 and the serving cell of the second SIM 710 to determine whether the polarity of the first frequency error estimation needs to be reversed in order to be applied by the second SIM 710.

In some aspects, the second SIM 710 may determine whether the polarity of the first frequency error estimation needs to be reversed in order to be applied by the second SIM 710 based at least in part on comparing a polarity of a received energy estimate value variation associated with the serving cell of the first SIM 705 to a polarity of a received energy estimate value variation associated with the serving cell of the second SIM 710. For example, as described above, the first SIM 705 may indicate the polarity of the received energy estimate value variation associated with the serving cell of the first SIM 705 in the high mobility information associated with the first SIM 705. The second SIM 710 may measure a received energy value for a serving cell of the second SIM 710 based at least in part on the indication that the UE 120 is operating in the high mobility environment. For example, the second SIM 710 may receive the indication that the UE 120 is operating in the high mobility environment and may perform a wake up procedure (e.g., a wake up measurement) in response to receiving the indication that the UE 120 is operating in the high mobility environment. The second SIM 710 may measure the received energy value for the serving cell of the second SIM 710 based at least in part on performing the wake up procedure (e.g., the wake up measurement).

The second SIM 710 may determine a polarity of a received energy estimate value variation for the serving cell of the second SIM 710 based at least in part on comparing the received energy value for the serving cell to a previous received energy value of the serving cell. In other words, the second SIM 710 may determine whether the received energy value of the serving cell has increased (e.g., a positive polarity of the received energy estimate value variation) or decreased (e.g., a negative polarity of the received energy estimate value variation) since a previous received energy estimate value measurement.

The second SIM 710 may determine whether the polarity of the first frequency error estimation needs to be reversed in order to be applied by the second SIM 710 based at least in part on determining whether the polarity of the received energy estimate value variation for the first SIM 705 is the same as or different than the polarity of the received energy estimate value variation for the second SIM 710. For example, if the polarities of the received energy estimate value variations for the first SIM 705 and the second SIM 710 are the same, then the second SIM 710 may determine that the UE 120 is moving in the same direction with respect to the serving cells of the first SIM 705 and the second SIM 710. If the polarities of the received energy estimate value variations for the first SIM 705 and the second SIM 710 are different (e.g., opposite), then the second SIM 710 may determine that the UE 120 is moving in opposite directions with respect to the serving cells of the first SIM 705 and the second SIM 710.

For example, the second SIM 710 may determine that the second frequency error estimation (e.g., associated with the second SIM 710) is the first frequency error estimation if the polarity of the received energy estimate value variation for the second SIM 710 is the same as the polarity of the received energy estimate value variation for the first SIM 705 (e.g., both polarities being negative or both polarities being positive). The second SIM 710 may determine that the second frequency error estimation is the first frequency error estimation with a reversed polarity (e.g., multiplied by a value of 1) if the polarity of the received energy estimate value variation for the second SIM 710 is different than (e.g., opposite of) the polarity of the received energy estimate value variation for the first SIM 705 (e.g., where one polarity is negative and the other polarity is positive). As a result, the second SIM 710 may be enabled to apply a correct frequency error estimation (e.g., with a correct polarity) to improve performance in the high mobility environment.

In some aspects, the second SIM 710 may determine whether the polarity of the first frequency error estimation needs to be reversed in order to be applied by the second SIM 710 based at least in part on information stored by the UE 120 (e.g., in a non-volatile memory). For example, as described above, a deployment of cells (e.g., of base stations 110 and/or of RRHs) along a path associated with the high mobility environment (e.g., along a HST track) may be known and/or fixed. Therefore, a polarity combination associated with different cells (e.g., with different base stations 110 and/or different RRHs) along the path may be determined and/or stored by the UE 120. For example, as the deployment of cells may be known, a polarity combination for two cells can be stored by the UE 120 that indicates whether the polarity for the cells is the same or different when the UE 120 is camped (e.g., connected to) to each cell (e.g., on different SIMs). The UE 120 may store polarity combinations for multiple cells that are deployed along the path associated with the high mobility environment in a database. In some aspects, the UE 120 may receive an update to the database via an over-the-air (OTA) message (e.g., indicating a change in a polarity combination or providing new polarity combinations for new cells deployed along the path). In some aspects, the UE 120 may use the stored information in combination with location information of the UE 120 (e.g., indicating a location of the UE 120) to determine whether the polarity of the first frequency error estimation needs to be reversed in order to be applied by the second SIM 710.

As described above, the first SIM 705 may provide an indication of an identifier associated with the serving cell of the first SIM 705 in the high mobility information associated with the first SIM 705. The second SIM 710 may identify a first identifier associated with a serving cell of the second SIM 710 (e.g., a PCI, an identifier of a TCI state, and/or a CGI). The second SIM 710 may identify a second identifier associated with a serving cell of the first SIM 705. The second SIM 710 may determine a polarity combination associated with the serving cell of the second SIM 710 and the serving cell of the first SIM 705 based at least in part on identifying information stored by the UE 120 associated with the first identifier and the second identifier. For example, the second SIM 710 may perform a lookup operation using the first identifier and the second identifier in a database that indicates polarity combinations for cells deployed along the path of the high mobility environment, as described above.

The polarity combination may indicate whether frequency error estimations associated with the serving cell of the second SIM 710 and frequency error estimations associated with the serving cell of the first SIM 705 have a same polarity (e.g., both positive or both negative) or different (e.g., opposite or reversed) polarities. The second SIM 710 may determine that the second frequency error estimation is the first frequency error estimation if the polarity combination indicates that frequency error estimations associated with the serving cell of the second SIM 710 and frequency error estimations associated with the serving cell of the first SIM 705 have a same polarity. Alternatively, the second SIM 710 may determine that the second frequency error estimation is the first frequency error estimation with a reversed polarity (e.g., multiplied by a value of −1) if the polarity combination indicates that frequency error estimations associated with the serving cell of the second SIM 710 and frequency error estimations associated with the serving cell of the first SIM 705 have different (e.g., opposite or reversed) polarities. As a result, the second SIM 710 may be enabled to apply a correct frequency error estimation (e.g., with a correct polarity) to improve performance in the high mobility environment. Additionally, using stored information to identify and/or determine the correct frequency error estimation (e.g., with a correct polarity) for the second SIM 710 may conserve resources associated with performing measurements to identify and/or determine the correct frequency error estimation.

As shown by reference number 730, the second SIM 710 may apply the second frequency error estimation (e.g., associated with the second SIM 710) that is determined as described above. As the high mobility environment may be associated with high frequency errors (e.g., high Doppler shifts), applying the second frequency error estimation to measurements and/or communications associated with the serving cell of the second SIM 710 may improve communication performance of the second SIM 710 in the high mobility environment. For example, applying the second frequency error estimation to measurements and/or communications associated with the serving cell of the second SIM 710 may improve a loop tracking performance for the second SIM 710 that is operating in an idle mode. The second SIM 710 may apply the second frequency error estimation when measuring and/or communicating with the serving cell for the second SIM 710, as described herein.

As shown by reference number 735, the second SIM 710 may operate in (e.g., transition to) a high mobility mode based at least in part on receiving, from the first SIM 705, the indication that the UE 120 is operating in the high mobility environment. As described above, the high mobility mode may include the second SIM 710 performing search and measurement procedures more frequently (e.g., the second SIM 710 may decrease a periodicity associated with configured search and measurement procedures to perform the search and measurement procedures more often). For example, the second SIM 710 may modify a periodicity of a search and measurement procedure, associated with the second SIM 710, to a modified periodicity (e.g., that results in the second SIM 710 performing the search and measurement procedure more often) based at least in part on the indication that the UE 120 is operating in the high mobility environment. The second SIM 710 may perform the search and measurement procedure using the modified periodicity to improve performance of the second SIM 710 in the high mobility environment. Additionally, or alternatively, the high mobility mode may include aggressive or more robust loop tracking, demodulation enhancements, and/or other improvements to avoid TTL aliasing, among other examples, to improve performance of the second SIM 710 while operating in the high mobility environment.

Additionally, or alternatively, the high mobility mode may include triggering a panic mode search and measurement procedure if an RSRP value of the serving cell of the second SIM 710 does not satisfy a threshold. A panic mode search and measurement procedure may include the second SIM 710 refraining from entering a sleep state associated with the idle mode (e.g., associated with a configured DRX cycle), performing a wake up from a sleep state associated with the idle mode, and/or continuously performing a search and measurement procedure for one or more operating frequencies to enable the second SIM 710 to quickly identify a new cell to connect to. For example, the second SIM 710 may measure an RSRP value for the serving cell of the second SIM 710 based at least in part on the indication that the UE 120 is operating in the high mobility environment. The second SIM 710 may determine whether the RSRP value for the serving cell of the second SIM 710 satisfies a threshold. The second SIM 710 may trigger a panic mode search and measurement procedure if the RSRP value for the serving cell of the second SIM 710 does not satisfy the threshold. As a result, the second SIM 710 may be enabled to quickly trigger a panic mode search and measurement procedure to ensure that the second SIM 710 can quickly find a suitable cell in the high mobility environment when the RSRP value of the serving cell is poor (e.g., does not satisfy the threshold). This may reduce a likelihood of, or a risk of, an RLF associated with the second SIM 710.

As a result, the second SIM 710 may be enabled to accurately determine a frequency error estimation to be applied by the second SIM 710 (e.g., based at least in part on the first frequency error estimation provided by the first SIM 705). Additionally, the second SIM 710, operating in an idle mode, may be enabled to reduce an amount of time associated with detecting that the UE 120 is operating in the high mobility environment. This may ensure that the second SIM 710 can quickly transition to operating in the high mobility mode (e.g., with more frequent search and measurement procedures). As a result, the second SIM 710 may reduce a likelihood of an RLF on the second SIM 710 that is due to a delay in transitioning to the high mobility mode (e.g., as described above). Additionally, the second SIM 710 may be enabled to quickly identify if a measurement value (e.g., an RSRP value) of the serving cell of the second SIM 710 is poor (e.g., is below a threshold). Therefore, the second SIM 710 may be enabled to immediately trigger a panic mode search and measurement procedure if the RSRP of the serving cell of the second SIM 710 is poor (e.g., rather than waiting until a measurement at a next paging occasion associated with the idle mode). This may ensure that the second SIM 710 can quickly identify a new serving cell to establish a connection with based at least in part on performing the panic mode search and measurement procedure, thereby improving performance of the second SIM 710 and the UE 120.

As indicated above, FIG. 7 is provided as an example. Other examples may differ from what is described with respect to FIG. 7.

Figure 8:
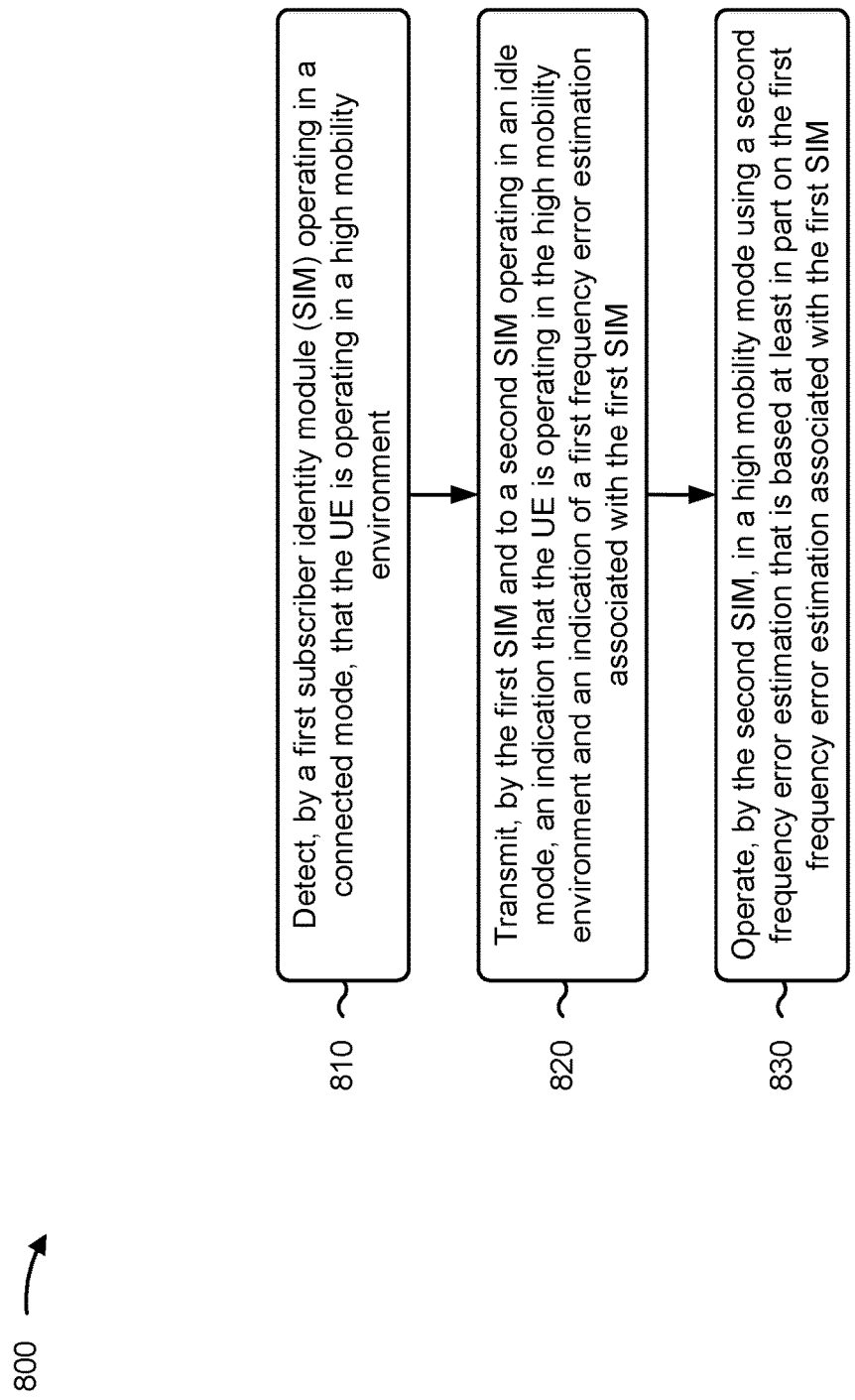
FIG. 8 is a diagram illustrating an example process associated with an optimized multi-SIM mode in a high mobility environment, in accordance with the present disclosure.

FIG. 8 is a diagram illustrating an example process 800 performed, for example, by a UE, in accordance with the present disclosure. Example process 800 is an example where the UE (e.g., UE 120) performs operations associated with an optimized multi-SIM mode in high mobility environments.

As shown in FIG. 8, in some aspects, process 800 may include detecting, by a first SIM operating in a connected mode, that the UE is operating in a high mobility environment (block 810). For example, the UE and/or the first SIM (e.g., using detection component 908, depicted in FIG. 9) may detect, by the first SIM operating in the connected mode, that the UE is operating in a high mobility environment, as described above.

As further shown in FIG. 8, in some aspects, process 800 may include transmitting, by the first SIM and to a second SIM operating in an idle mode, an indication that the UE is operating in the high mobility environment and an indication of a first frequency error estimation associated with the first SIM (block 820). For example, the UE and/or the first SIM (e.g., using transmission component 904, depicted in FIG. 9) may transmit, by the first SIM and to a second SIM operating in an idle mode, an indication that the UE is operating in the high mobility environment and an indication of a first frequency error estimation associated with the first SIM, as described above.

As further shown in FIG. 8, in some aspects, process 800 may include operating, by the second SIM, in a high mobility mode using a second frequency error estimation that is based at least in part on the first frequency error estimation associated with the first SIM (block 830). For example, the UE and/or the second SIM (e.g., using reception component 902, transmission component 904, and/or determination component 910, depicted in FIG. 9) may operate in a high mobility mode using a second frequency error estimation that is based at least in part on the first frequency error estimation associated with the first SIM, as described above.

Process 800 may include additional aspects, such as any single aspect or any combination of aspects described below and/or in connection with one or more other processes described elsewhere herein.

In a first aspect, transmitting the indication that the UE is operating in the high mobility environment and the indication of the first frequency error estimation associated with the first SIM includes transmitting, by the first SIM and to the second SIM, an indication of at least one of: a polarity of a received energy estimate value variation associated with the first SIM, or an identifier associated with a serving cell of the first SIM.

In a second aspect, alone or in combination with the first aspect, transmitting the indication that the UE is operating in the high mobility environment and the indication of the first frequency error estimation associated with the first SIM includes transmitting, by the first SIM and to the second SIM, the indication that the UE is operating in the high mobility environment and the indication of the first frequency error estimation associated with the first SIM during a paging occasion associated with the second SIM.

In a third aspect, alone or in combination with one or more of the first and second aspects, transmitting the indication that the UE is operating in the high mobility environment and the indication of the first frequency error estimation associated with the first SIM includes transmitting, by the first SIM to the second SIM, the indication that the UE is operating in the high mobility environment and the indication of the first frequency error estimation associated with the first SIM via a SIM interface of the UE.

In a fourth aspect, alone or in combination with one or more of the first through third aspects, process 800 includes determining the second frequency error estimation associated with the second SIM based at least in part on the first frequency error estimation associated with the first SIM.

In a fifth aspect, alone or in combination with the fourth aspect, determining the second frequency error estimation associated with the second SIM includes measuring, by the second SIM, a received energy estimate value for a serving cell of the second SIM based at least in part on the indication that the UE is operating in the high mobility environment, determining a first polarity of a received energy estimate value variation for the second SIM based at least in part on comparing the received energy estimate value for the serving cell to a previous received energy estimate value of the serving cell, and determining that the second frequency error estimation associated with the second SIM is: the first frequency error estimation associated with the first SIM if the first polarity is a same polarity as a second polarity of a received energy estimate value variation for the first SIM, or the first frequency error estimation associated with the first SIM with a reversed polarity if the first polarity is a different polarity than the second polarity of the received energy estimate value for the first SIM.

In a sixth aspect, alone or in combination with the fourth aspect, determining the second frequency error estimation associated with the second SIM includes identifying a first identifier associated with a first serving cell of the second SIM, identifying a second identifier associated with a second serving cell of the first SIM, determining a polarity combination associated with the first serving cell and the second serving cell based at least in part on identifying information stored by the UE associated with the first identifier and the second identifier, and determining, based at least in part on the polarity combination, that the second frequency error estimation associated with the second SIM is the first frequency error estimation associated with the first SIM, or the first frequency error estimation associated with the first SIM with a reversed polarity.

In a seventh aspect, alone or in combination with one or more of the first through sixth aspects, operating in the high mobility mode using the second frequency error estimation includes modifying, by the second SIM, a periodicity of a search and measurement procedure, associated with the second SIM, to a modified periodicity based at least in part on the indication that the UE is operating in the high mobility environment, and performing, by the second SIM, the search and measurement procedure using the modified periodicity.

In an eighth aspect, alone or in combination with one or more of the first through seventh aspects, operating in the high mobility mode using the second frequency error estimation includes measuring, by the second SIM, an RSRP value for a serving cell of the second SIM based at least in part on the indication that the UE is operating in the high mobility environment, and triggering, by the second SIM, a panic mode search and measurement procedure if the RSRP value for the serving cell of the second SIM does not satisfy a threshold.

In a ninth aspect, alone or in combination with one or more of the first through eighth aspects, the high mobility environment is a high speed train environment.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
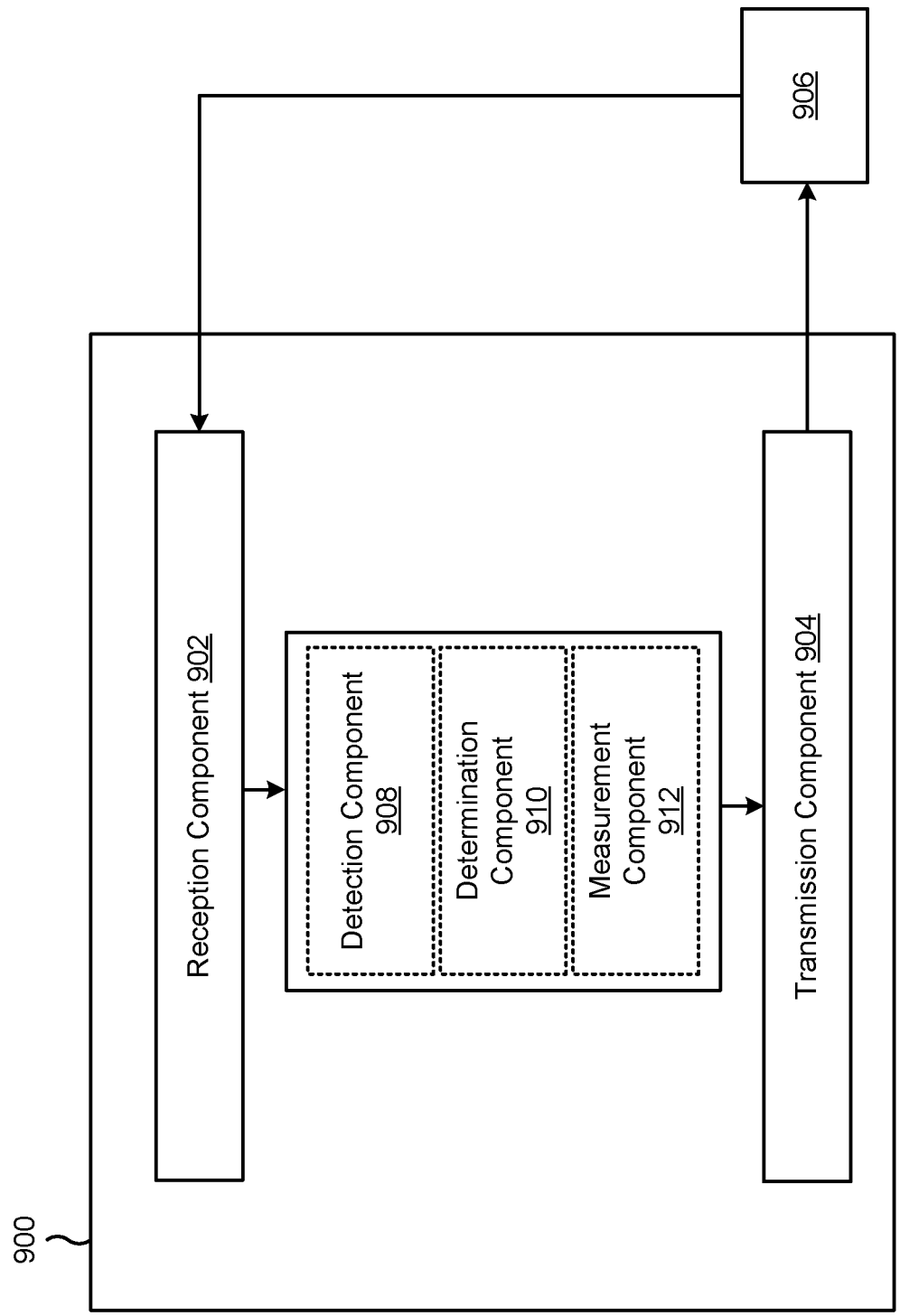
FIG. 9 is a block diagram of an example apparatus for wireless communication, in accordance with the present disclosure.

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include one or more of a detection component 908, a determination component 910, or a measurement component 912, among other examples.

In some aspects, the apparatus 900 may be configured to perform one or more operations described herein in connection with FIG. 7. Additionally, or alternatively, the apparatus 900 may be configured to perform one or more processes described herein, such as process 800 of FIG. 8, or a combination thereof. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The detection component 908 may detect, for a first SIM operating in a connected mode, that the UE is operating in a high mobility environment. The transmission component 904 may transmit, for the first SIM and to a second SIM operating in an idle mode, an indication that the UE is operating in the high mobility environment and an indication of a first frequency error estimation associated with the first SIM. The reception component 902, the transmission component 904, and/or the determination component 910 may cause the second SIM to operate in a high mobility mode using a second frequency error estimation that is based at least in part on the first frequency error estimation associated with the first SIM.

The transmission component 904 may transmit, for the first SIM and to the second SIM, an indication of at least one of: a polarity of a received energy estimate value variation associated with the first SIM, or an identifier associated with a serving cell of the first SIM.

The transmission component 904 may transmit, for the first SIM and to the second SIM, the indication that the UE 120 is operating in the high mobility environment and the indication of the first frequency error estimation associated with the first SIM during a paging occasion associated with the second SIM.

The transmission component 904 may transmit, for the first SIM and to the second SIM, the indication that the UE 120 is operating in the high mobility environment and the indication of the first frequency error estimation associated with the first SIM via a SIM interface of the UE 120.

The determination component 910 may determine the second frequency error estimation associated with the second SIM based at least in part on the first frequency error estimation associated with the first SIM.

The measurement component 912 may measure, for the second SIM, a received energy estimate value for a serving cell of the second SIM based at least in part on the indication that the UE 120 is operating in the high mobility environment. The determination component 910 may determine a first polarity of a received energy estimate value variation for the second SIM based at least in part on comparing the received energy estimate value for the serving cell to a previous received energy estimate value of the serving cell. The determination component 910 may determine that the second frequency error estimation associated with the second SIM is: the first frequency error estimation associated with the first SIM if the first polarity is a same polarity as a second polarity of a received energy estimate value variation for the first SIM, or the first frequency error estimation associated with the first SIM with a reversed polarity if the first polarity is a different polarity than the second polarity of the received energy estimate value for the first SIM.

The determination component 910 may identify a first identifier associated with a first serving cell of the second SIM. The determination component 910 may identify a second identifier associated with a second serving cell of the first SIM. The determination component 910 may determine a polarity combination associated with the first serving cell and the second serving cell based at least in part on identifying information stored by the UE 120 associated with the first identifier and the second identifier. The determination component 910 may determine, based at least in part on the polarity combination, that the second frequency error estimation associated with the second SIM is: the first frequency error estimation associated with the first SIM, or the first frequency error estimation associated with the first SIM with a reversed polarity.

The determination component 910 may modify, for the second SIM, a periodicity of a search and measurement procedure, associated with the second SIM, to a modified periodicity based at least in part on the indication that the UE is operating in the high mobility environment. The reception component 902 and/or the transmission component 904 may perform, for the second SIM, the search and measurement procedure using the modified periodicity.

The measurement component 912 may measure, for the second SIM, an RSRP value for a serving cell of the second SIM based at least in part on the indication that the UE is operating in the high mobility environment. The determination component 910 may trigger, for the second SIM, a panic mode search and measurement procedure if the RSRP value for the serving cell of the second SIM does not satisfy a threshold.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: detecting, by a first subscriber identity module (SIM) operating in a connected mode, that the UE is operating in a high mobility environment; transmitting, by the first SIM and to a second SIM operating in an idle mode, an indication that the UE is operating in the high mobility environment and an indication of a first frequency error estimation associated with the first SIM; and operating, by the second SIM, in a high mobility mode using a second frequency error estimation that is based at least in part on the first frequency error estimation associated with the first SIM.

Aspect 2: The method of Aspect 1, wherein transmitting the indication that the UE is operating in the high mobility environment and the indication of the first frequency error estimation associated with the first SIM comprises: transmitting, by the first SIM and to the second SIM, an indication of at least one of: a polarity of a received energy estimate value variation associated with the first SIM, or an identifier associated with a serving cell of the first SIM.

Aspect 3: The method of any of Aspects 1-2, wherein transmitting the indication that the UE is operating in the high mobility environment and the indication of the first frequency error estimation associated with the first SIM comprises: transmitting, by the first SIM and to the second SIM, the indication that the UE is operating in the high mobility environment and the indication of the first frequency error estimation associated with the first SIM during a paging occasion associated with the second SIM.

Aspect 4: The method of any of Aspects 1-3, wherein transmitting the indication that the UE is operating in the high mobility environment and the indication of the first frequency error estimation associated with the first SIM comprises: transmitting, by the first SIM and to the second SIM, the indication that the UE is operating in the high mobility environment and the indication of the first frequency error estimation associated with the first SIM via a SIM interface of the UE.

Aspect 5: The method of any of Aspects 1-4, further comprising: determining the second frequency error estimation associated with the second SIM based at least in part on the first frequency error estimation associated with the first SIM.

Aspect 6: The method of Aspect 5, wherein determining the second frequency error estimation associated with the second SIM comprises: measuring, by the second SIM, a received energy estimate value for a serving cell of the second SIM based at least in part on the indication that the UE is operating in the high mobility environment; determining a first polarity of a received energy estimate value variation for the second SIM based at least in part on comparing the received energy estimate value for the serving cell to a previous received energy estimate value of the serving cell; and determining that the second frequency error estimation associated with the second SIM is: the first frequency error estimation associated with the first SIM if the first polarity is a same polarity as a second polarity of a received energy estimate value variation for the first SIM, or the first frequency error estimation associated with the first SIM with a reversed polarity if the first polarity is a different polarity than the second polarity of the received energy estimate value variation for the first SIM.

Aspect 7: The method of Aspect 5, wherein determining the second frequency error estimation associated with the second SIM comprises: identifying a first identifier associated with a first serving cell of the second SIM; identifying a second identifier associated with a second serving cell of the first SIM; determining a polarity combination associated with the first serving cell and the second serving cell based at least in part on identifying information stored by the UE associated with the first identifier and the second identifier; and determining, based at least in part on the polarity combination, that the second frequency error estimation associated with the second SIM is: the first frequency error estimation associated with the first SIM, or the first frequency error estimation associated with the first SIM with a reversed polarity.

Aspect 8: The method of any of Aspects 1-7, wherein operating in the high mobility mode using the second frequency error estimation comprises: modifying, by the second SIM, a periodicity of a search and measurement procedure, associated with the second SIM, to a modified periodicity based at least in part on the indication that the UE is operating in the high mobility environment; and performing, by the second SIM, the search and measurement procedure using the modified periodicity.

Aspect 9: The method of any of Aspects 1-8, wherein operating in the high mobility mode using the second frequency error estimation comprises: measuring, by the second SIM, a reference signal received power (RSRP) value for a serving cell of the second SIM based at least in part on the indication that the UE is operating in the high mobility environment; and triggering, by the second SIM, a panic mode search and measurement procedure if the RSRP value for the serving cell of the second SIM does not satisfy a threshold.

Aspect 10: The method of any of Aspects 1-9, wherein the high mobility environment is a high speed train environment.

Aspect 11: An apparatus for wireless communication at a device, comprising a processor; memory coupled with the processor; and instructions stored in the memory and executable by the processor to cause the apparatus to perform the method of one or more Aspects of Aspects 1-10.

Aspect 12: A device for wireless communication, comprising a memory and one or more processors coupled to the memory, the memory and the one or more processors configured to perform the method of one or more Aspects of Aspects 1-10.

Aspect 13: An apparatus for wireless communication, comprising at least one means for performing the method of one or more Aspects of Aspects 1-10.

Aspect 14: A non-transitory computer-readable medium storing code for wireless communication, the code comprising instructions executable by a processor to perform the method of one or more Aspects of Aspects 1-10.

Aspect 15: A non-transitory computer-readable medium storing a set of instructions for wireless communication, the set of instructions comprising one or more instructions that, when executed by one or more processors of a device, cause the device to perform the method of one or more Aspects of Aspects 1-10.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors operatively coupled to the memory, the memory and the one or more processors configured to:
        detect, by a first subscriber identity module (SIM) operating in a connected mode, that the UE is operating in a high mobility environment;
        transmit, by the first SIM and to a second SIM operating in an idle mode, an indication that the UE is operating in the high mobility environment and an indication of a first frequency error estimation associated with the first SIM; and
        operate, by the second SIM, in a high mobility mode using a second frequency error estimation that is based at least in part on the first frequency error estimation associated with the first SIM.

2. The UE of claim 1, wherein the memory and the one or more processors are configured to, when transmitting the indication that the UE is operating in the high mobility environment and the indication of the first frequency error estimation associated with the first SIM:
    transmit, by the first SIM and to the second SIM, an indication of at least one of:
        a polarity of a received energy estimate value variation associated with the first SIM, or
        an identifier associated with a serving cell of the first SIM.

3. The UE of claim 1, wherein the memory and the one or more processors are configured to, when transmitting the indication that the UE is operating in the high mobility environment and the indication of the first frequency error estimation associated with the first SIM:
    transmit, by the first SIM and to the second SIM, the indication that the UE is operating in the high mobility environment and the indication of the first frequency error estimation associated with the first SIM during a paging occasion associated with the second SIM.

4. The UE of claim 1, wherein the memory and the one or more processors are configured to, when transmitting the indication that the UE is operating in the high mobility environment and the indication of the first frequency error estimation associated with the first SIM:
  transmit, by the first SIM and to the second SIM, the indication that the UE is operating in the high mobility environment and the indication of the first frequency error estimation associated with the first SIM via a SIM interface of the UE.

5. The UE of claim 1, wherein the memory and the one or more processors are further configured to:
  determine the second frequency error estimation associated with the second SIM based at least in part on the first frequency error estimation associated with the first SIM.

6. The UE of claim 5, wherein the memory and the one or more processors are configured to, when determining the second frequency error estimation associated with the second SIM:
  measure, by the second SIM, a received energy estimate value for a serving cell of the second SIM based at least in part on the indication that the UE is operating in the high mobility environment;
  determine a first polarity of a received energy estimate value variation for the second SIM based at least in part on comparing the received energy estimate value for the serving cell to a previous received energy estimate value of the serving cell; and
  determine that the second frequency error estimation associated with the second SIM is:
    the first frequency error estimation associated with the first SIM if the first polarity is a same polarity as a second polarity of a received energy estimate value variation for the first SIM, or
    the first frequency error estimation associated with the first SIM with a reversed polarity if the first polarity is a different polarity than the second polarity of the received energy estimate value variation for the first SIM.

7. The UE of claim 5, wherein the memory and the one or more processors are configured to, when determining the second frequency error estimation associated with the second SIM:
  identify a first identifier associated with a first serving cell of the second SIM;
  identify a second identifier associated with a second serving cell of the first SIM;
  determine a polarity combination associated with the first serving cell and the second serving cell based at least in part on identifying information stored by the UE associated with the first identifier and the second identifier; and
  determine, based at least in part on the polarity combination, that the second frequency error estimation associated with the second SIM is:
    the first frequency error estimation associated with the first SIM, or
    the first frequency error estimation associated with the first SIM with a reversed polarity.

8. The UE of claim 1, wherein the memory and the one or more processors are configured to, when operating in the high mobility mode using the second frequency error estimation:
  modify, by the second SIM, a periodicity of a search and measurement procedure, associated with the second SIM, to a modified periodicity based at least in part on the indication that the UE is operating in the high mobility environment; and
  perform, by the second SIM, the search and measurement procedure using the modified periodicity.

9. The UE of claim 1, wherein the memory and the one or more processors are configured to, when operating in the high mobility mode using the second frequency error estimation:
  measure, by the second SIM, a reference signal received power (RSRP) value for a serving cell of the second SIM based at least in part on the indication that the UE is operating in the high mobility environment; and
  trigger, by the second SIM, a panic mode search and measurement procedure if the RSRP value for the serving cell of the second SIM does not satisfy a threshold.

10. The UE of claim 1, wherein the high mobility environment is a high speed train environment.

11. A method of wireless communication performed by a user equipment (UE), comprising:
  detecting, by a first subscriber identity module (SIM) operating in a connected mode, that the UE is operating in a high mobility environment;
  transmitting, by the first SIM and to a second SIM operating in an idle mode, an indication that the UE is operating in the high mobility environment and an indication of a first frequency error estimation associated with the first SIM; and
  operating, by the second SIM, in a high mobility mode using a second frequency error estimation that is based at least in part on the first frequency error estimation associated with the first SIM.

12. The method of claim 11, wherein transmitting the indication that the UE is operating in the high mobility environment and the indication of the first frequency error estimation associated with the first SIM comprises:
  transmitting, by the first SIM and to the second SIM, an indication of at least one of:
    a polarity of a received energy estimate value variation associated with the first SIM, or
    an identifier associated with a serving cell of the first SIM.

13. The method of claim 11, wherein transmitting the indication that the UE is operating in the high mobility environment and the indication of the first frequency error estimation associated with the first SIM comprises:
  transmitting, by the first SIM and to the second SIM, the indication that the UE is operating in the high mobility environment and the indication of the first frequency error estimation associated with the first SIM during a paging occasion associated with the second SIM.

14. The method of claim 11, wherein transmitting the indication that the UE is operating in the high mobility environment and the indication of the first frequency error estimation associated with the first SIM comprises:
  transmitting, by the first SIM and to the second SIM, the indication that the UE is operating in the high mobility environment and the indication of the first frequency error estimation associated with the first SIM via a SIM interface of the UE.

15. The method of claim 11, further comprising:
  determining the second frequency error estimation associated with the second SIM based at least in part on the first frequency error estimation associated with the first SIM.

16. The method of claim 15, wherein determining the second frequency error estimation associated with the second SIM comprises:

measuring, by the second SIM, a received energy estimate value for a serving cell of the second SIM based at least in part on the indication that the UE is operating in the high mobility environment;

determining a first polarity of a received energy estimate value variation for the second SIM based at least in part on comparing the received energy estimate value for the serving cell to a previous received energy estimate value of the serving cell; and determining that the second frequency error estimation associated with the second SIM is:

the first frequency error estimation associated with the first SIM if the first polarity is a same polarity as a second polarity of a received energy estimate value variation for the first SIM, or the first frequency error estimation associated with the first SIM with a reversed polarity if the first polarity is a different polarity than the second polarity of the received energy estimate value variation for the first SIM.

17. The method of claim 15, wherein determining the second frequency error estimation associated with the second SIM comprises:

identifying a first identifier associated with a first serving cell of the second SIM;

identifying a second identifier associated with a second serving cell of the first SIM;

determining a polarity combination associated with the first serving cell and the second serving cell based at least in part on identifying information stored by the UE associated with the first identifier and the second identifier; and determining, based at least in part on the polarity combination, that the second frequency error estimation associated with the second SIM is:

the first frequency error estimation associated with the first SIM, or the first frequency error estimation associated with the first SIM with a reversed polarity.

18. The method of claim 11, wherein operating in the high mobility mode using the second frequency error estimation comprises:

modifying, by the second SIM, a periodicity of a search and measurement procedure, associated with the second SIM, to a modified periodicity based at least in part on the indication that the UE is operating in the high mobility environment; and performing, by the second SIM, the search and measurement procedure using the modified periodicity.

19. The method of claim 11, wherein operating in the high mobility mode using the second frequency error estimation comprises:

measuring, by the second SIM, a reference signal received power (RSRP) value for a serving cell of the second SIM based at least in part on the indication that the UE is operating in the high mobility environment; and triggering, by the second SIM, a panic mode search and measurement procedure if the RSRP value for the serving cell of the second SIM does not satisfy a threshold.

20. The method of claim 11, wherein the high mobility environment is a high speed train environment.

21. A non-transitory computer-readable medium storing a set of instructions for wireless communication, the set of instructions comprising:

one or more instructions that, when executed by one or more processors of a user equipment (UE), cause the UE to:

detect, by a first subscriber identity module (SIM) operating in a connected mode, that the UE is operating in a high mobility environment;

transmit, by the first SIM and to a second SIM operating in an idle mode, an indication that the UE is operating in the high mobility environment and an indication of a first frequency error estimation associated with the first SIM; and operate, by the second SIM, in a high mobility mode using a second frequency error estimation that is based at least in part on the first frequency error estimation associated with the first SIM.

22. The non-transitory computer-readable medium of claim 21, wherein the one or more instructions further cause the UE to:

determine the second frequency error estimation associated with the second SIM based at least in part on the first frequency error estimation associated with the first SIM.

23. The non-transitory computer-readable medium of claim 22, wherein the one or more instructions, that cause the UE to determine the second frequency error estimation associated with the second SIM, cause the UE to:

measure, by the second SIM, a received energy estimate value for a serving cell of the second SIM based at least in part on the indication that the UE is operating in the high mobility environment;

determine a first polarity of a received energy estimate value variation for the second SIM based at least in part on comparing the received energy estimate value for the serving cell to a previous received energy estimate value of the serving cell; and determine that the second frequency error estimation associated with the second SIM is:

the first frequency error estimation associated with the first SIM if the first polarity is a same polarity as a second polarity of a received energy estimate value variation for the first SIM, or the first frequency error estimation associated with the first SIM with a reversed polarity if the first polarity is a different polarity than the second polarity of the received energy estimate value variation for the first SIM.

24. The non-transitory computer-readable medium of claim 22, wherein the one or more instructions, that cause the UE to determine the second frequency error estimation associated with the second SIM, cause the UE to:

identify a first identifier associated with a first serving cell of the second SIM;

identify a second identifier associated with a second serving cell of the first SIM;

determine a polarity combination associated with the first serving cell and the second serving cell based at least in part on identifying information stored by the UE associated with the first identifier and the second identifier; and determine, based at least in part on the polarity combination, that the second frequency error estimation associated with the second SIM is:

the first frequency error estimation associated with the first SIM, or the first frequency error estimation associated with the first SIM with a reversed polarity.

25. The non-transitory computer-readable medium of claim 21, wherein the one or more instructions, that cause the UE to operate in the high mobility mode using the second frequency error estimation, cause the UE to:
- modify, by the second SIM, a periodicity of a search and measurement procedure, associated with the second SIM, to a modified periodicity based at least in part on the indication that the UE is operating in the high mobility environment; and
- perform, by the second SIM, the search and measurement procedure using the modified periodicity.

26. An apparatus for wireless communication, comprising:
- means for detecting, by a first subscriber identity module (SIM) operating in a connected mode, that the apparatus is operating in a high mobility environment;
- means for transmitting, by the first SIM and to a second SIM operating in an idle mode, an indication that the apparatus is operating in the high mobility environment and an indication of a first frequency error estimation associated with the first SIM; and
- means for operating, by the second SIM, in a high mobility mode using a second frequency error estimation that is based at least in part on the first frequency error estimation associated with the first SIM.

27. The apparatus of claim 26, further comprising:
- means for determining the second frequency error estimation associated with the second SIM based at least in part on the first frequency error estimation associated with the first SIM.

28. The apparatus of claim 27, wherein the means for determining the second frequency error estimation associated with the second SIM comprises:
- means for measuring, by the second SIM, a received energy estimate value for a serving cell of the second SIM based at least in part on the indication that the UE is operating in the high mobility environment;
- means for determining a first polarity of a received energy estimate value variation for the second SIM based at least in part on comparing the received energy estimate value for the serving cell to a previous received energy estimate value of the serving cell; and
- means for determining that the second frequency error estimation associated with the second SIM is:
  - the first frequency error estimation associated with the first SIM if the first polarity is a same polarity as a second polarity of a received energy estimate value variation for the first SIM, or
  - the first frequency error estimation associated with the first SIM with a reversed polarity if the first polarity is a different polarity than the second polarity of the received energy estimate value variation for the first SIM.

29. The apparatus of claim 27, wherein the means for determining the second frequency error estimation associated with the second SIM comprises:
- means for identifying a first identifier associated with a first serving cell of the second SIM;
- means for identifying a second identifier associated with a second serving cell of the first SIM;
- means for determining a polarity combination associated with the first serving cell and the second serving cell based at least in part on identifying information stored by the UE associated with the first identifier and the second identifier; and
- means for determining, based at least in part on the polarity combination, that the second frequency error estimation associated with the second SIM is:
  - the first frequency error estimation associated with the first SIM, or
  - the first frequency error estimation associated with the first SIM with a reversed polarity.

30. The apparatus of claim 26, wherein the means for operating in the high mobility mode using the second frequency error estimation comprises:
- means for measuring, by the second SIM, a reference signal received power (RSRP) value for a serving cell of the second SIM based at least in part on the indication that the UE is operating in the high mobility environment; and
- means for triggering, by the second SIM, a panic mode search and measurement procedure if the RSRP value for the serving cell of the second SIM does not satisfy a threshold.

* * * * *